US008214266B2

(12) United States Patent
Ogle et al.

(10) Patent No.: US 8,214,266 B2
(45) Date of Patent: Jul. 3, 2012

(54) BROCHURE INVENTORY AND DISTRIBUTION TRACKING SYSTEM

(75) Inventors: Robert E. Ogle, Sevierville, TN (US); Stephen T. Williams, Sevierville, TN (US)

(73) Assignee: Impact Marketing, LLC, Sevierville, TN (US)

( * ) Notice: Subject to any disclaimer, the term of this patent is extended or adjusted under 35 U.S.C. 154(b) by 1053 days.

(21) Appl. No.: 11/425,227

(22) Filed: Jun. 20, 2006

(65) Prior Publication Data

US 2007/0293971 A1 Dec. 20, 2007

(51) Int. Cl.
*G06Q 10/00* (2006.01)

(52) U.S. Cl. ........................................... 705/28; 283/55

(58) Field of Classification Search ..................... 705/28
See application file for complete search history.

(56) References Cited

U.S. PATENT DOCUMENTS

| | | | | |
|---|---|---|---|---|
| 3,874,756 | A | 4/1975 | Greene | |
| 4,623,073 | A | 11/1986 | Hansen | |
| 5,165,554 | A | 11/1992 | Schlesinger | |
| 5,515,303 | A | 5/1996 | Cargin, Jr. et al. | |
| 6,341,271 | B1 * | 1/2002 | Salvo et al. | 705/28 |
| 6,418,416 | B1 * | 7/2002 | Rosenberg et al. | 705/28 |
| 6,454,106 | B1 | 9/2002 | Howard | |
| 6,671,698 | B2 * | 12/2003 | Pickett et al. | 1/1 |
| 6,705,473 | B1 | 3/2004 | Schlesinger | |
| 6,873,949 | B2 | 3/2005 | Hickman et al. | |
| 6,895,330 | B2 | 5/2005 | Cato et al. | |
| 6,901,304 | B2 | 5/2005 | Swan et al. | |

FOREIGN PATENT DOCUMENTS

| | | |
|---|---|---|
| CA | 2452207 | 6/2004 |
| CA | 2456959 | 7/2005 |
| EP | 0421795 | 4/1991 |
| EP | 1224892 | 7/2002 |
| JP | 07116044 | 5/1995 |
| JP | 20022133523 | 5/2002 |
| NZ | 0509581 | 7/2002 |
| WO | 017398 | 9/2001 |
| WO | 0051038 | 10/2001 |

* cited by examiner

*Primary Examiner* — Scott Zare
*Assistant Examiner* — Talia Crawley
(74) *Attorney, Agent, or Firm* — Luedeka Neely Group, P.C.

(57) ABSTRACT

A brochure inventory and tracking system provides a method and apparatus for distributing and tracking brochures. A brochure inventory route is assigned to a driver of a vehicle. The brochure inventory route includes at least one brochure distribution point having at least one brochure rack having at least one brochure bin. A handheld device runs remote inventory software and is carried by the driver. A server runs central inventory software and communicates wirelessly with the handheld device. An estimated brochure level for each brochure bin and the number and identity of brochure necessary to refill each brochure bin are determined and the brochure bins are refilled. Information regarding the estimated brochure level for each brochure bin is uploaded to the server for analysis. Customer inventory software allows a customer to access substantially real time data regarding brochure distribution.

5 Claims, 29 Drawing Sheets

Search for open spaces by any combination of the following — 178    166

Route: ☐ Check all Routes
- ☐ 321 WEST/TOWNSEND  ☐ COM  ☐ GAN
- ☐ GATEAST  ☐ GATENORTH  ☐ GATSOUTH
- ☑ INTERSTATE  ☐ PFNNORH  ☑ PFSOUTH
- ☐ SEVNORTH  ☐ SEVSOUTH  ☐ SKI MOUNTAIN
- ☐ Zero Racks

168

Traffic Rating: ☐ Check all Ratings
- ☑ High
- ☑ Hot Spot
- ☑ Medium

170

Location Type: ☐ CHECK ALL LOCATION TYPES
- ☐ ATTRACTION  ☐ CABIN RENTAL  ☑ CAMPGROUND
- ☐ CONVIENENT MARK  ☐ FAST FOODS  ☐ INFORMATION CENTER
- ☐ LODGING  ☐ MUSIC THEATER  ☐ REAL ESTATE
- ☐ RESORTS TS  ☑ RESTAURANT  ☐ RETAIL

172

City of Rack: ☐ CHECK ALL RACK CITIES
- ☑ ALCOA  ☑ ATHENS  ☑ CLINTON
- ☑ COSBY  ☑ CROSSVILLE  ☑ DANDRIDGE
- ☑ GATLINBURG  ☑ GATLINURG  ☑ INTERSTATE
- ☑ INTERSTATE SWEETWATER  ☑ INTERSTATE ATHENS  ☑ INTERSTATE BLOUNTVILLE
- ☑ INTERSTATE BRISTOL  ☑ INTERSTATE BULLS GAP  ☑ INTERSTATE CARYVILLE
- ☑ INTERSTATE CLINTON  ☑ INTERSTATE CROSSVILLE  ☑ INTERSTATE HARTFORD
- ☑ INTERSTATE HEISHELL  ☑ INTERSTATE HEISKELL  ☑ INTERSTATE JELLICO
- ☑ INTERSTATE KINGSPORT  ☑ INTERSTATE LAKE CITY  ☑ INTERSTATE LENIOR CITY
- ☑ INTERSTATE LOUDON  ☑ INTERSTATE MORRISTOWN  ☑ INTERSTATE NIOTA
- ☑ INTERSTATE PHILADELPHIA  ☑ INTERSTATE PIONEER  ☑ INTERSTATE SWEETWATER
- ☑ INTERSTATE WHITE PINE  ☑ KNOXVILLE  ☑ LENIOR CITY
- ☑ MARYVILLE  ☑ NEWPORT  ☑ PIDEON FORGE
- ☑ PIGEON FIRGE  ☑ PIGEON FORGE  ☑ SEVIERVILLE
- ☑ SEYMOUR  ☑ SWEETWATER  ☑ TOWNSEND

174

[ SEARCH ] — 176

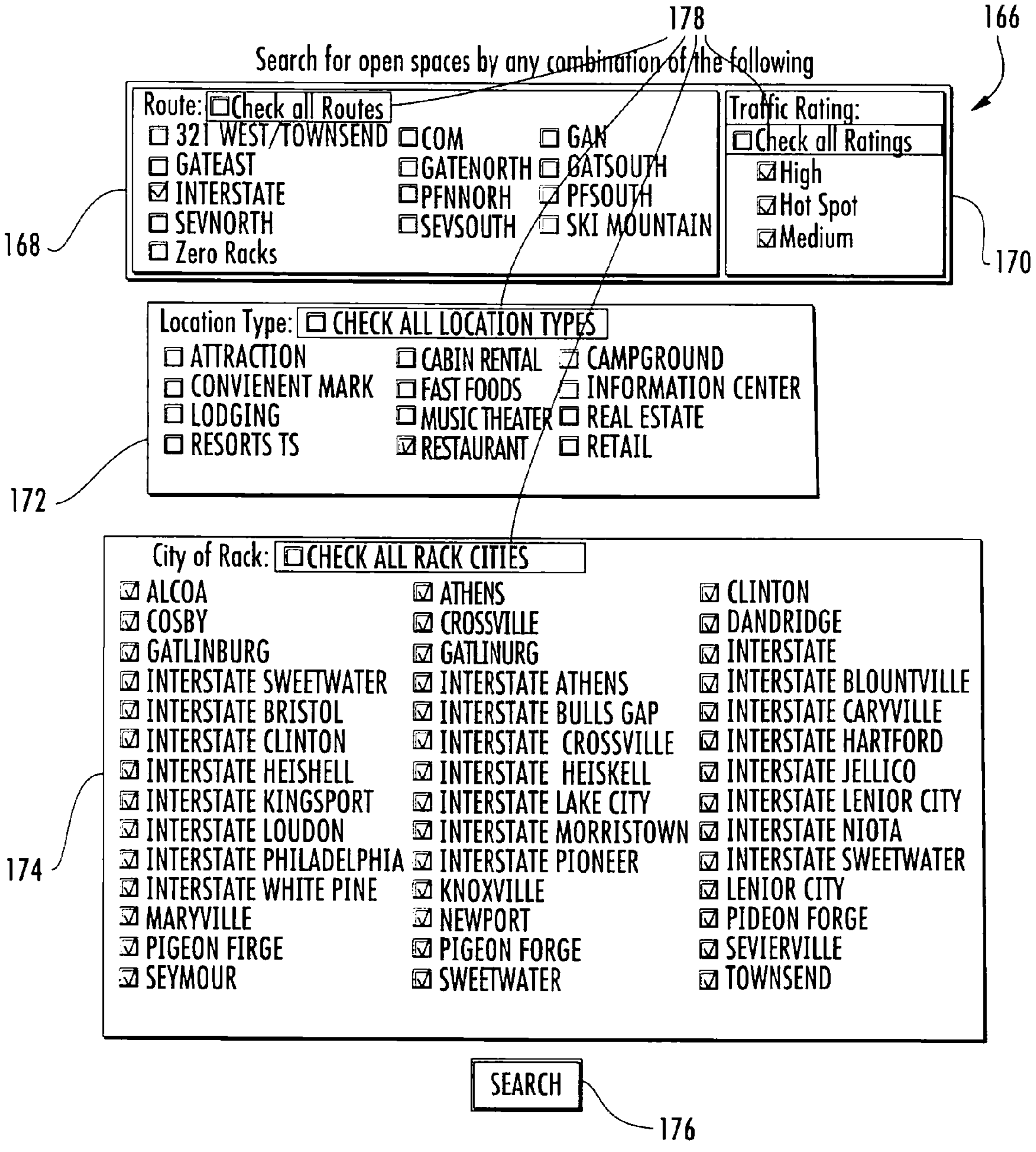

FIG. 5A

14 Minutes, 42 Seconds until you are automatically logged off.

[CUSTOMERS][ADVERTISEMENTS][DATABASE MAINTENANCE][REPORTS][LOGOFF]

218 ⟶

Customer Company Name: ABCD ⟵ 220
Include Prospects ☐
[Search] ⟵ 222

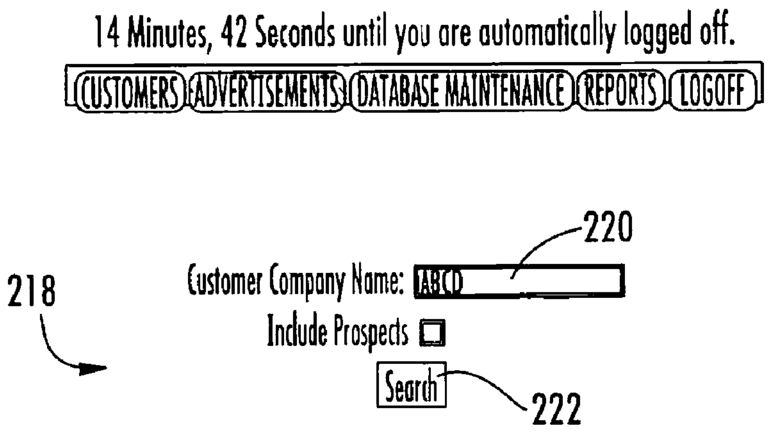

FIG. 7A

14 Minutes, 53 Seconds until you are automatically logged off.

[CUSTOMERS][ADVERTISEMENTS][DATABASE MAINTENANCE][REPORTS][LOGOFF]

Customer Contact Info: ABCD
attn: Bob Smith
1234 Nowhere St.
Nowhere, TN 12345
(v)
(f) 5559876543
(c)

226 ⟶

Mediums this customer has:
Advertisements (edit) ⟵ 224

Locations
Customer is currently in 0 locations ⟶ 228

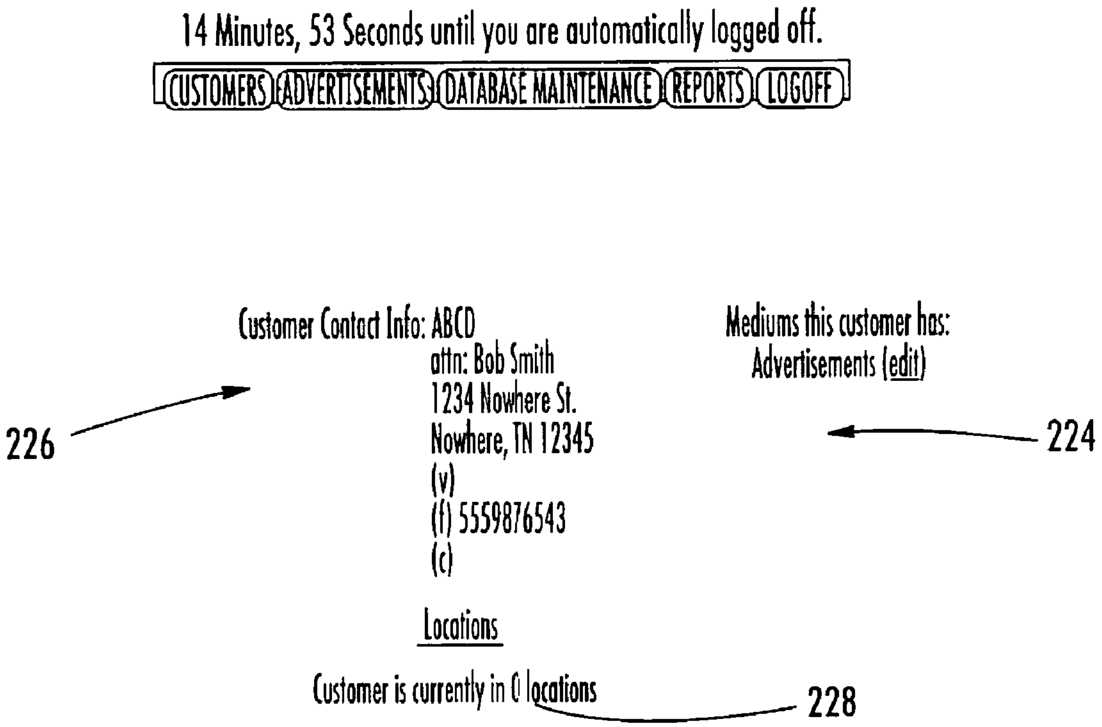

FIG. 7B

13 Minutes, 26 Seconds until you are automatically logged off. — 68

[CUSTOMERS] [ADVERTISEMENTS] [DATABASE MAINTENANCE] [REPORTS] [LOGOFF]

Location Name: [ ]
Location City: [Knoxville]
Include Inactive Locations ☐

[Search]

— 296

Add Location

Enter Location Information

294 →

Location Name: [ ]
Address 1: [ ]
Address 2: [ ]
City: [ ]
State: [ ]
Zip Code: [ ]
Location Type: [Attraction ▽]
Contact Name: [ ]
Contact Phone: [ ]
Contact Email: [ ]
Notes: [ ]

} 298

[Submit]

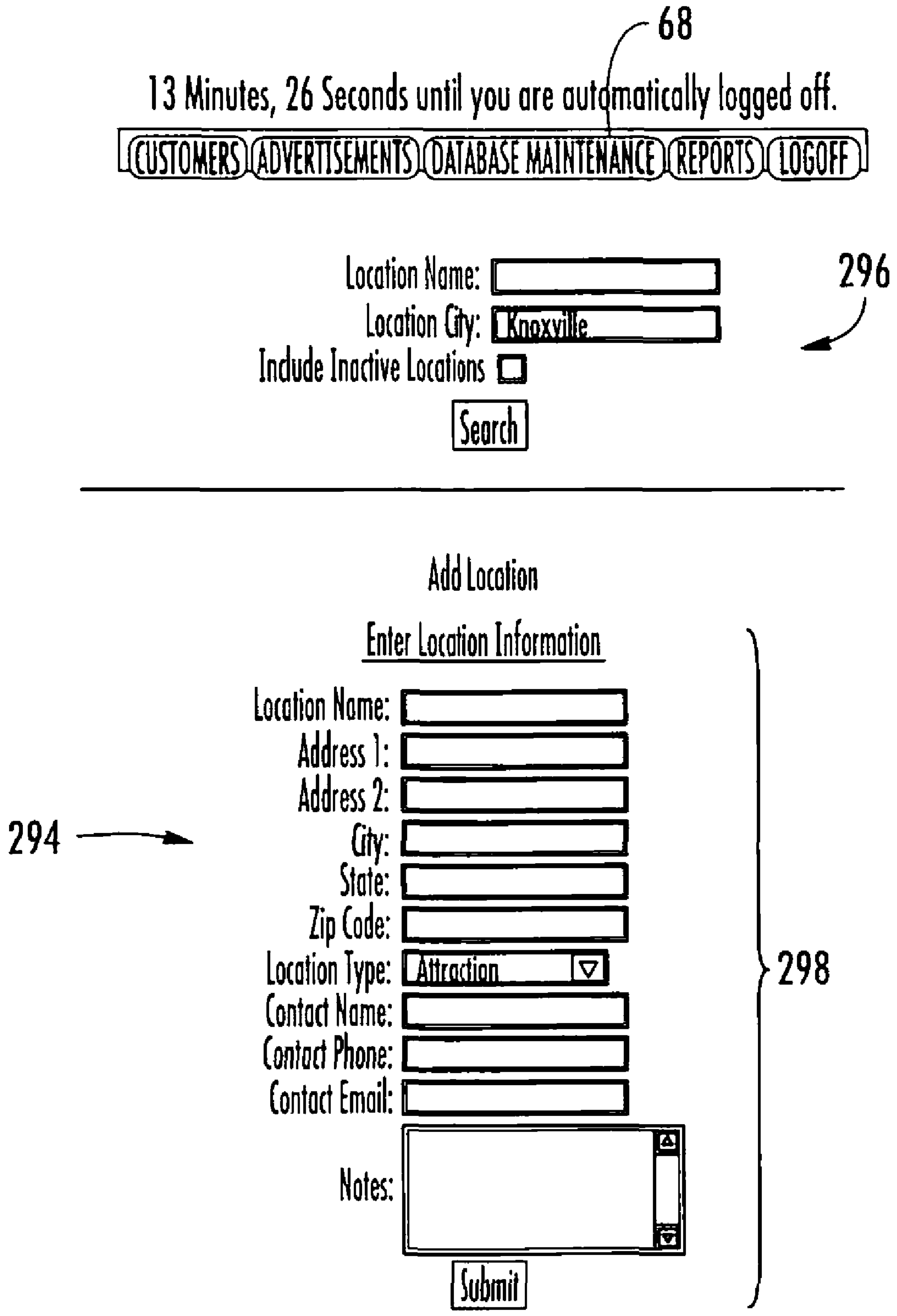

FIG. 9C

14 Minutes, 54 Seconds until you are automatically logged off.

[CUSTOMERS][ADVERTISEMENTS][DATABASE MAINTENANCE][REPORTS][LOGOFF]

Price Types
New Type Added!
[Add Another]

| Price Type | | | |
|---|---|---|---|
| | | [Show InActive Types] | |
| Top | modify | deactivate | ← 318 |
| Prime | modify | deactivate | |
| Premium | modify | deactivate | |
| Regular | modify | deactivate | |
| Top Billboard | modify | deactivate | |
| Bottom Billboard | modify | deactivate | |
| State Welcome Center | modify | deactivate | |
| Interstate | modify | deactivate | |
| El Cheapo | modify | deactivate | |

312 brackets the Price Type list; 320 points to El Cheapo

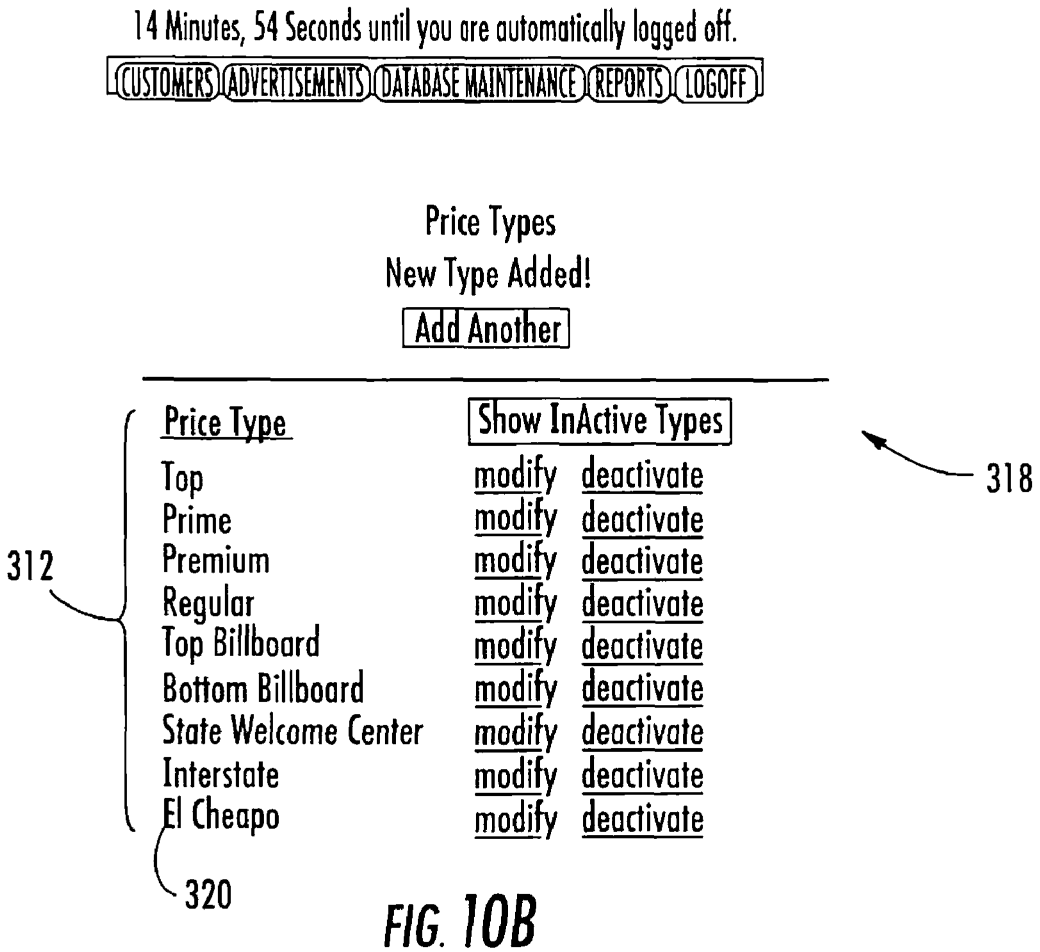

*FIG. 10B*

14 Minutes, 54 Seconds until you are automatically logged off.

[CUSTOMERS][ADVERTISEMENTS][DATABASE MAINTENANCE][REPORTS][LOGOFF]

Rack Types

Type Name: [_____] ← 324

[ADD]

| Rack Types | [Show InActive Types] | | |
|---|---|---|---|
| Freestanding | modify | deactivate | |
| T-80 | modify | deactivate | } 326 |
| Wall | modify | deactivate | |

322

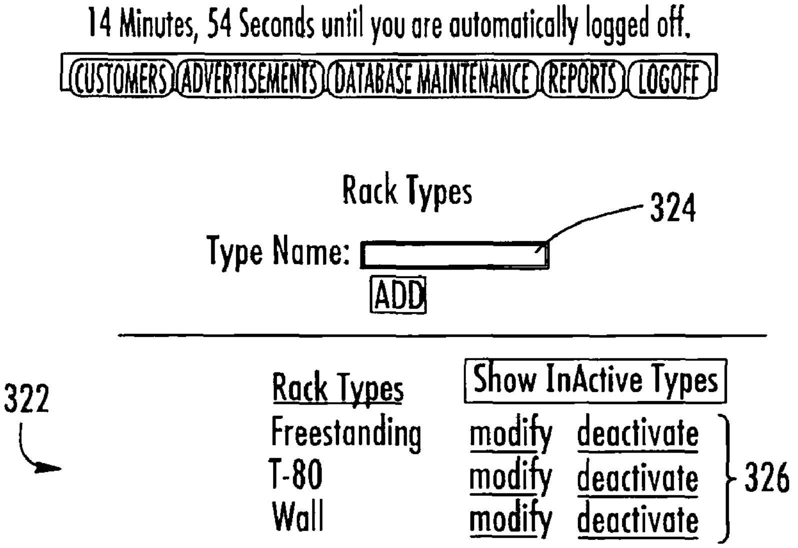

*FIG. 11*

Routes

Type Name: [        ] —338

[ADD]

---

Routes | [Show InActive Types]
332 →
- SEVNORTH — modify deactivate
- PFSOUTH — modify deactivate
- PFNORTH — modify deactivate
- INTERSTATE — modify deactivate —340
- GATSOUTH — modify deactivate
- GATNORTH — modify deactivate
- GATEAST — modify deactivate
- 321 WEST/TOWNSEND — modify deactivate
- SEVSOUTH — modify deactivate
- SKI MOUNTAIN — modify deactivate
- GAN — modify deactivate
- Zero Racks — modify deactivate
- COM — modify deactivate

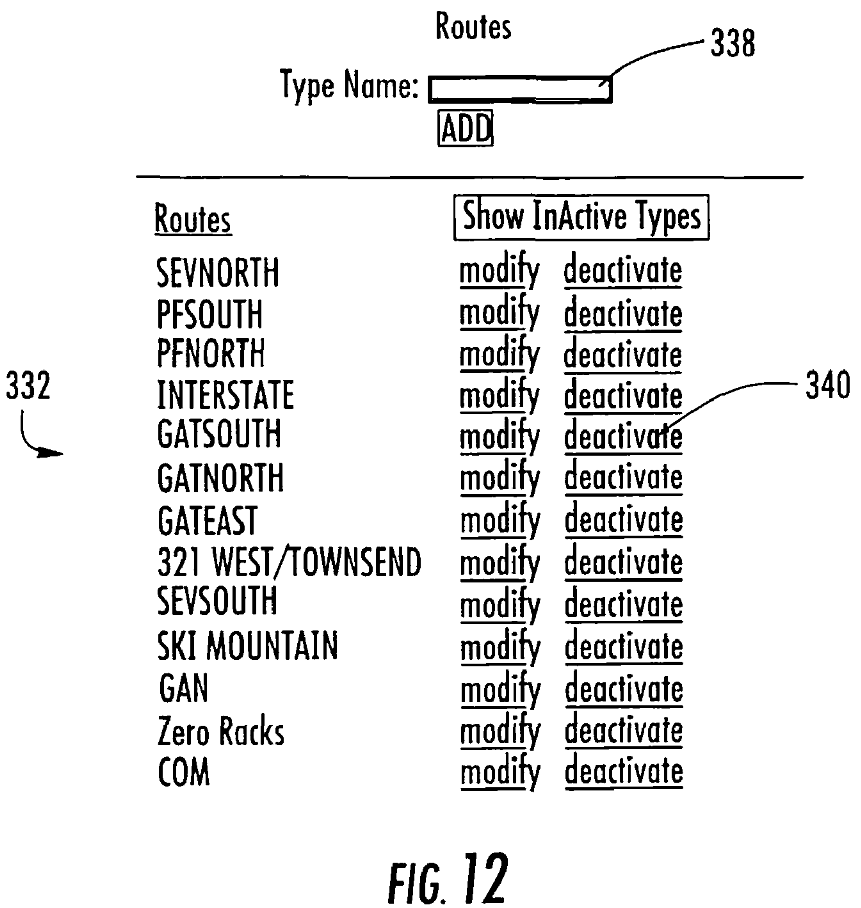

14 Minutes, 56 Seconds until you are automatically logged off.

[CUSTOMERS][ADVERTISEMENTS][DATABASE MAINTENANCE][REPORTS][LOGOFF]

Traffic Rating

Type Name: [        ] —338

[ADD]

---

334 →
Traffic Rating | [Show InActive Types]
- Hot Spot — modify deactivate —340
- High — modify deactivate
- Medium — modify deactivate

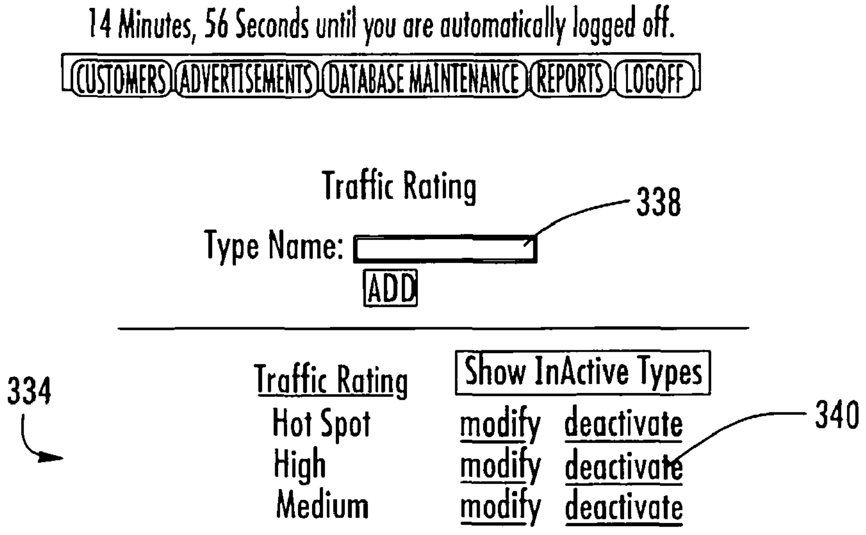

*FIG. 13*

14 Minutes, 55 Seconds until you are automatically logged off.

[ CUSTOMERS ][ ADVERTISEMENTS ][ DATABASE MAINTENANCE ][ REPORTS ][ LOGOFF ]

Users

Username: ☐
Password: ☐              338
First Name: ☐
Last Name: ☐
[ADD]

336

| Username | Show Inactive Users | |
|---|---|---|
| andy | modify | deactivate |
| csssupport | modify | deactivate |
| john | modify | deactivate |
| na | modify | deactivate |
| rogle | modify | deactivate |
| tyler | modify | deactivate |

340

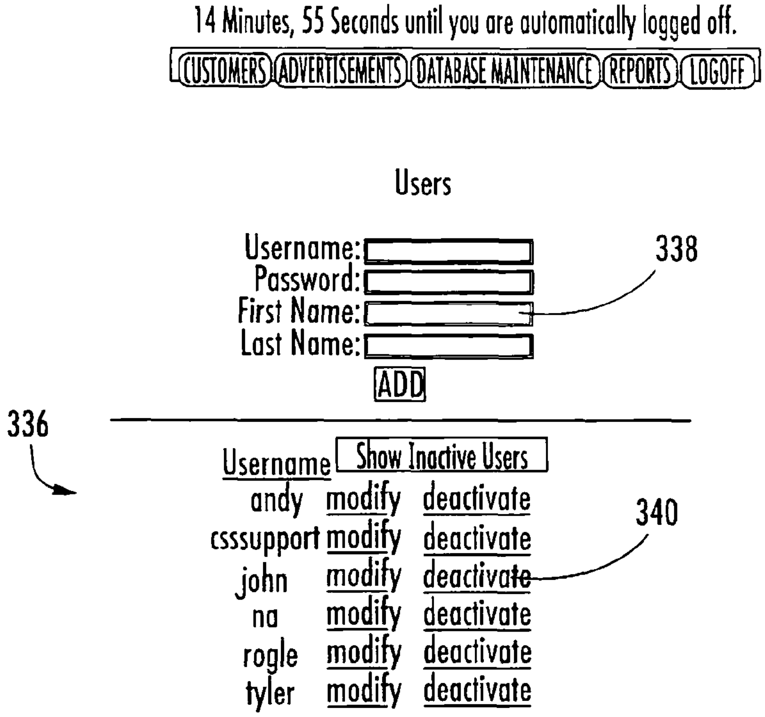

13 Minutes, 37 Seconds until you are automatically logged off.

[ CUSTOMERS ][ ADVERTISEMENTS ][ DATABASE MAINTENANCE ][ REPORTS ][ LOGOFF ]

342

Users

Username: ☐
Password: ☐
First Name: ☐
Last Name: ☐
[ADD]

Customer Financials
Customer Inventory
Customer Rack Stats
Customer Statistics
Distribution Report
Driver Route Report
Movement By
Rack Activity Summary
Rack Diagram
Rack Statistics
Route Income Report
Yearly Income Report
Event Log

344

| Username | Show Inactive Users | |
|---|---|---|
| andy | modify | deactivate |
| csssupport | modify | deactivate |
| john | modify | deactivate |
| na | modify | deactivate |
| rogle | modify | deactivate |
| tyler | modify | deactivate |

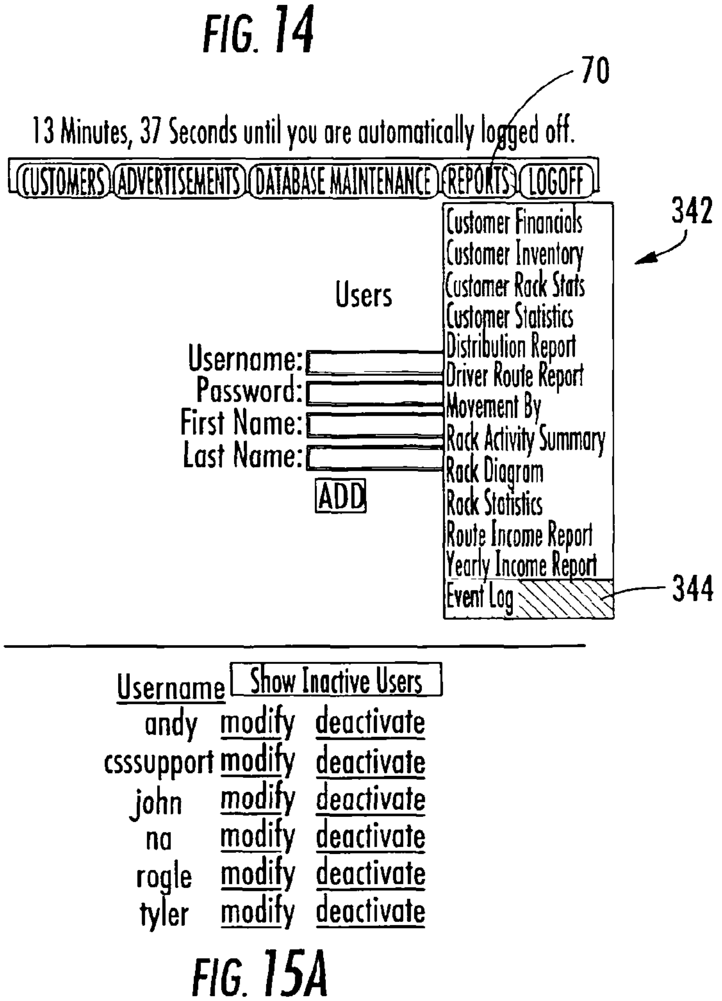

FIG. 15A

| Date | User | Event |
|---|---|---|
| 8/25/2005 5:11:00 PM | Neely, Andy | Added new medium type of Advertisements for customer ABCD |

BROCHURE INVENTORY AND DISTRIBUTION TRACKING SYSTEM

FIELD

The present invention relates to the field of inventory and distribution tracking systems for brochures. More particularly, it relates to a system for tracking the brochure inventory at a plurality of locations by way of a handheld device communicating with a server.

BACKGROUND AND SUMMARY

Historically, inventory distribution and tracking systems have provided for management of routes and inventory at a particular point of purchase, such as a vending machine. Such management is performed by use of mobile equipment, which connects with the point of purchase equipment and communicates with a centralized system server. Such systems do not address restocking, tracking, and analyzing brochure inventory or provide real-time access for customers to data regarding brochure inventory. Furthermore, some inventory systems transmit data to a central server in order to develop a purchase order and subsequently provide the necessary delivery and replenishment of inventory at particular locations. Other inventory management systems require electronic price labeling to track inventory stock as it is funneled through the stream of business.

Systems for selecting, registering, and collecting brochures during trade fairs and similar shows disclose identification codes registered at an exhibitor's stand where an organization selects wanted brochures. Identification information is scanned and used by exhibitors to compile appropriate brochures for specific organizations. Such a brochure system does not replenish brochure stands based on software algorithms utilizing route-based implementation or collect data useful for marketing or management purposes and provide such data in real-time.

Therefore, a brochure inventory tracking and management system is needed that utilizes route-based inspection of brochure bins, portable software capable of assisting with inspection and replenishment of brochure inventory as well as collecting and analyzing brochure inventory data, and real-time access to such data through a brochure inventory software interface available over the Internet.

This and other needs are met by a system for managing information regarding distribution of brochures along a distribution route that includes a brochure distribution center and at least one brochure bin at a brochure distribution point, where the brochure bin has a capacity for storing brochures of a particular identity. The system uses a mobile device and a central server. The method for managing information comprises storing information indicative of the capacity of the brochure bin, storing information indicative of the identity of brochure associated with each brochure bin, entering into the mobile device a value indicating an estimated brochure level for the brochure bin, determining a number of brochures necessary to fill the brochure bin up to the capacity, the determining based at least in part on the entered value and the stored information, displaying on the mobile device the number of brochures necessary to fill the brochure bin up to the capacity, based at least in part on the stored information, determining the identity of brochure associated with each brochure bin, and displaying on the mobile device the identity of brochure associated with each brochure bin.

Furthermore, the system includes means for performing each of the method steps detailed above. Finally, the system for managing information comprises a central server having a memory, a processor, and a communicator and a mobile device having a memory, a processor, a display, and a communicator.

BRIEF DESCRIPTION OF THE DRAWINGS

The preferred embodiments of the invention will now be described in further detail with reference to the drawings wherein like reference characters designate like or similar elements throughout the several drawings as follows:

FIGS. 5A, 5B, 5C, and 5D are screenshots of the customer find spaces option of the brochure inventory software.

FIGS. 7A and 7B are screenshots of the customer search option of the brochure inventory software.

FIGS. 9A, 9B, 9C, 9D, 9E, and 9F are screenshots of the database maintenance location types option of the brochure inventory software.

FIGS. 10A and 10B are screenshots of the database maintenance prices option of the brochure inventory software.

FIG. 11 is a screenshot of the database maintenance rack types option of the brochure inventory software.

FIG. 12 is a screenshot of the database maintenance route option of the brochure inventory software.

FIG. 13 is a screenshot of the database maintenance traffic rating option of the brochure inventory software.

FIG. 14 is a screenshot of the database maintenance users option of the brochure inventory software.

FIGS. 15A and 15B are screenshots of the reports event log option of the brochure inventory software.

DETAILED DESCRIPTION

Figure 1A:
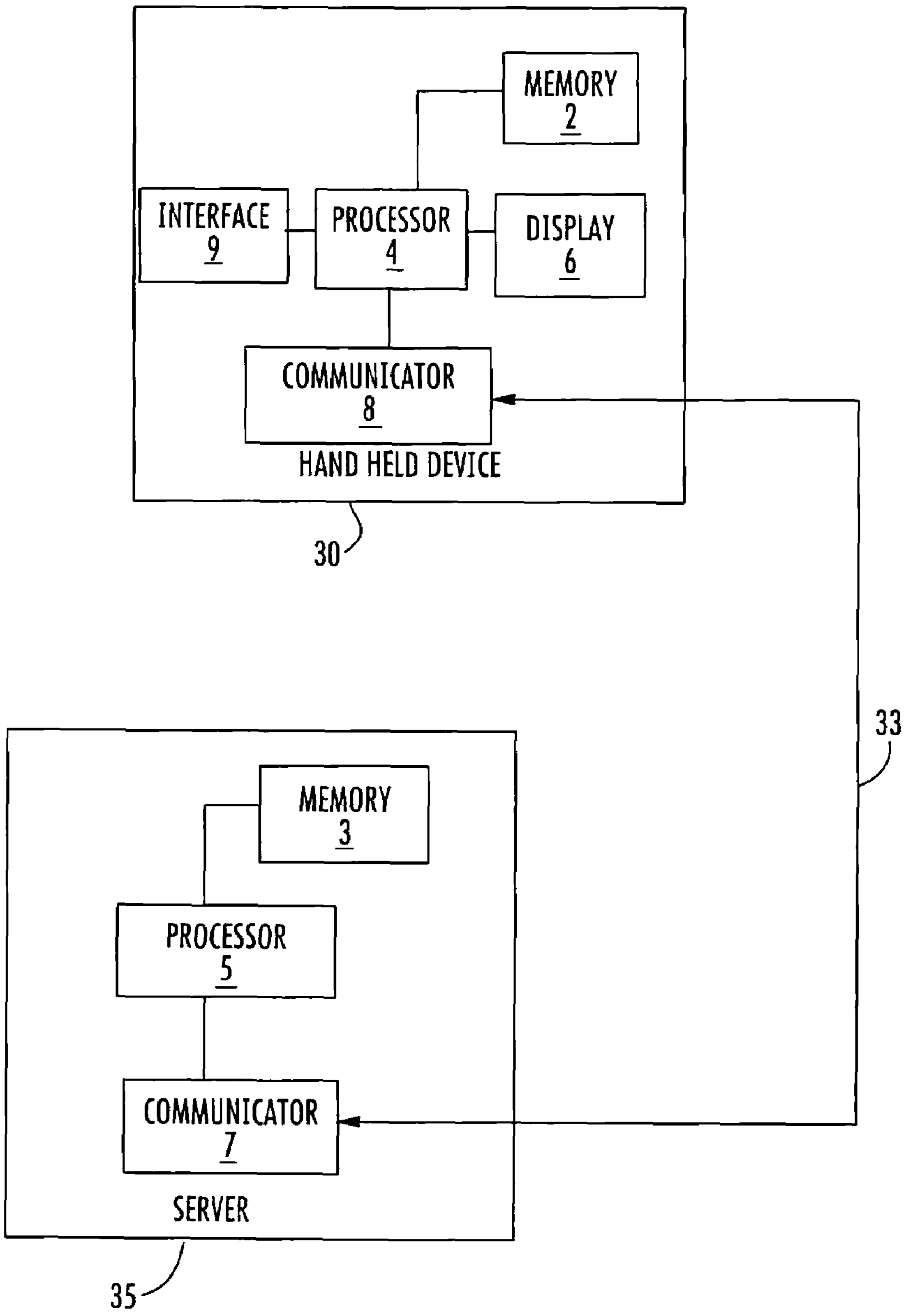
FIG. 1 A is a diagrammatic representation of a handheld device connected to a server.
FIG. 1B is diagrammatic representation of a brochure inventory route.
FIG. 1C is an illustration of a brochure rack having brochure bins.
FIG. 1D is a diagrammatic representation of a handheld device connected to a server including a database.
FIG. 1E is an expanded view of brochure inventory software including remote inventory software and central inventory software.

The present invention provides a brochure inventory distribution and tracking system for distributing and tracking brochure inventory along a brochure inventory route 10. The main components used to operate the brochure inventory distribution and tracking system are illustrated in the block diagram of FIG. 1A. A handheld device 30 is a portable device having a memory 2 connected to a processor 4. The memory 2 preferably includes random access memory and storage memory such as a hard-drive. The processor 4 is connected to a display 6 for displaying information to a user. The processor 4 is also connected to a user interface 9 for receiving input from a user. The user interface 9 may be part of the display 6 of the handheld device 30. Finally, the processor is connected to a communicator 8, which may be any type of communication, wireless or hard-wired. Preferably, the communicator is a wireless communicator such as Bluetooth, radio-wave, infrared, cellular wireless Internet, or some other type of wireless communication. The handheld device 30 is removably connected to the server 35 over connection 33. The server has a processor 5 connected to a memory 3, which preferably includes both a random access memory and a hard-drive for storage. The processor 5 of the server 35 is also connected to a communicator 7, which is preferably capable of communicating with multiple handheld devices 30 simultaneously and which is removably connected to the communicator 8 of the handheld device 30 in FIG. 1A via connection 33. Connection 33, as discussed above, is preferably a wireless connection permitting the handheld device 30 to be fully portable.

Figure 1B:
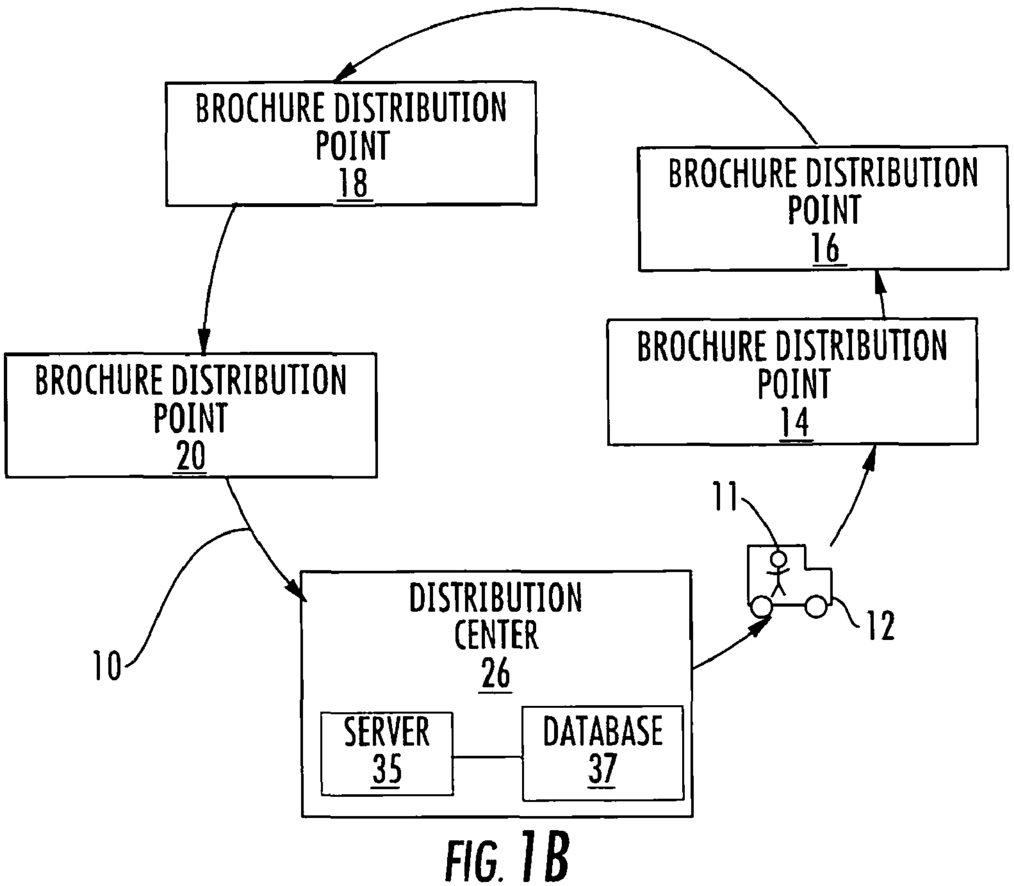
Figure 1D:
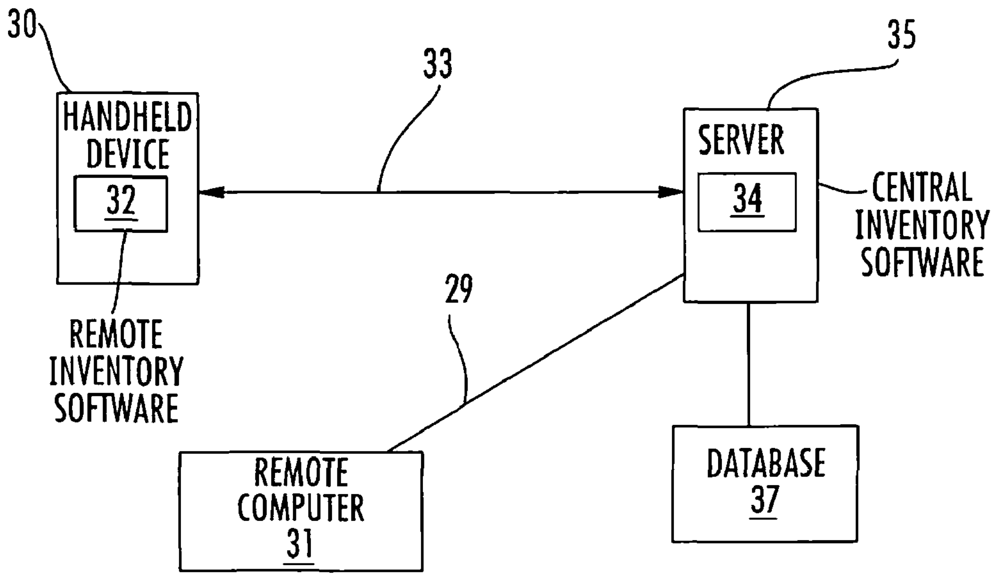
Figure 1E:
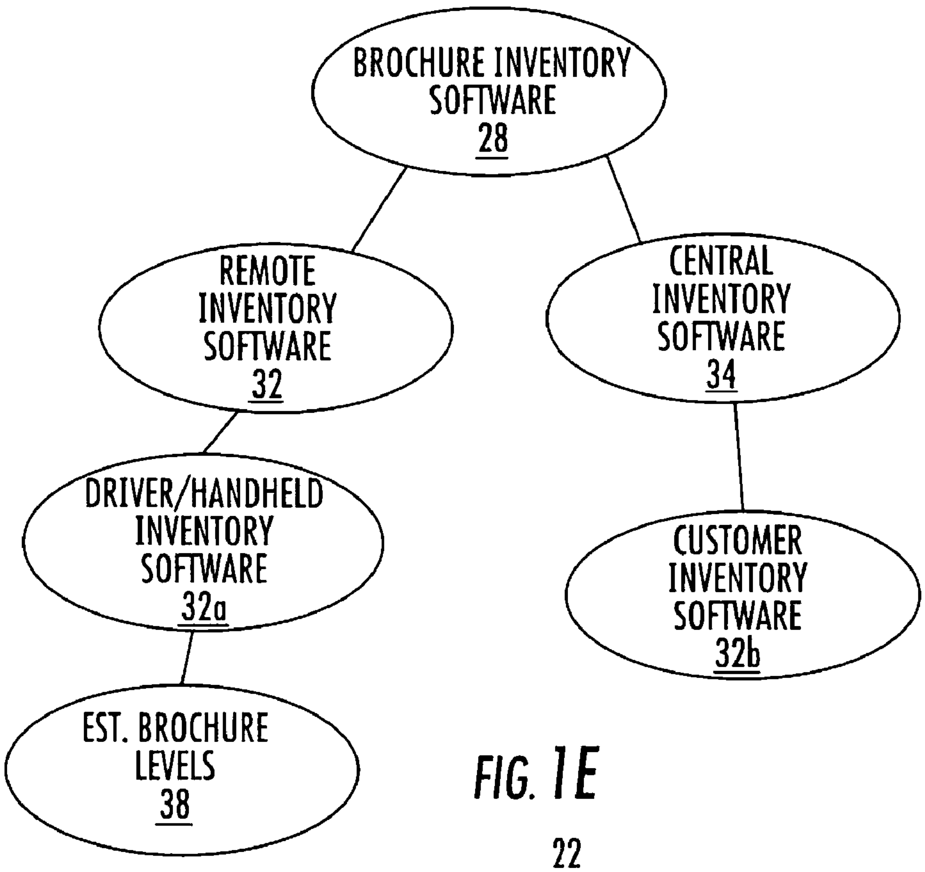
Figure 1C:
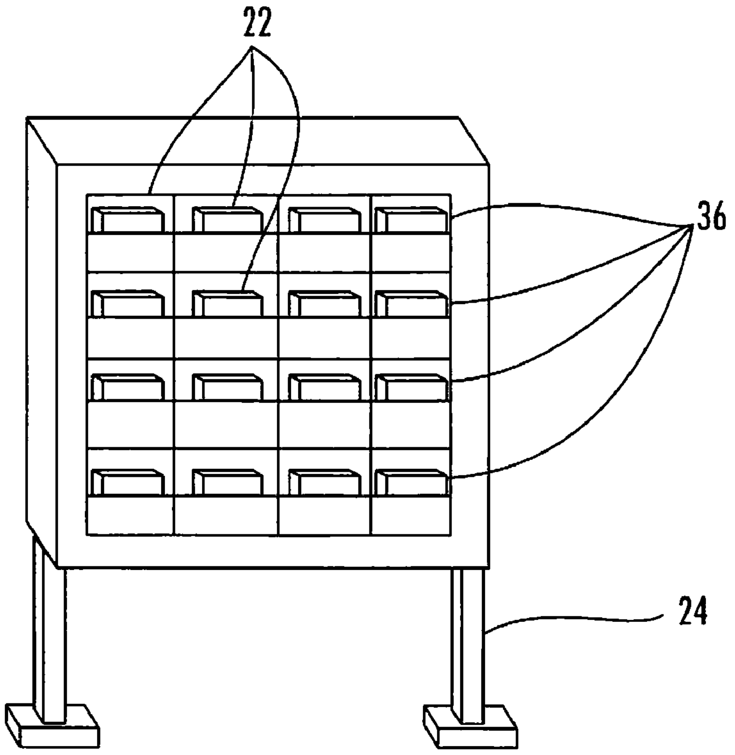

Referring now to FIG. 1B, a brochure inventor) route 10 is assigned to a driver 11 of a vehicle 12. The driver 11 runs the route 10 at regular time intervals such that all brochure distribution points 14, 16, 18, and 20 along the brochure inventory route 10 remain stocked with a sufficient supply of brochures 22 (FIG. 1C). Each brochure distribution point 14, 16, 18, and 20 may have one brochure rack 24 (FIG. 1C) or many brochure racks 24.

In one embodiment, five styles of brochure racks 24 are supplied by drivers along brochure inventory routes 10. The driver 11 departs in a vehicle 12 from a distribution center 26 with a supply of brochures 22 (FIG. 1C) sufficient to resupply every brochure rack 24 at every brochure distribution point 14, 16, 18, and 20 along the brochure inventory route 10. The driver 11 is able to determine the proper quantity and identity of brochures 22 necessary for the assigned brochure inventory route 10 by using the handheld device 30 controlled by the brochure inventory software 28 (as shown in FIGS. 2-16), which includes remote inventory software 32 and central inventory software 34 (FIGS. 1D and 1E). Remote inventory software 32 (FIGS. 1D and 1E) is loaded onto the handheld device 30 (FIG. 1D) carried by the driver 11, and central inventory software 34 is loaded on the server 35 located at the distribution center 26. The handheld device 30 is preferably a tablet computer with a touch screen such as a handheld device similar to model number "01+ ultra personal computer (uPC), a fully featured Windows XP computer sold at www.OQO.com. The handheld device 30 communicates to the driver 11 the quantity and identity of brochures 22 necessary for the chosen brochure inventory route 10. A driver 11 may also determine the quantity and identity of brochures 22 necessary for a specific brochure inventory route 10 by using the central inventory software 34 loaded on the server 35.

Once the driver 11 has been informed of the quantity and identity of brochures 22 necessary for a particular brochure inventory route 10, the driver 11 loads the requisite supply of brochures 22 into the driver's vehicle 12, inputs into the handheld device 30 that loading of the brochures 22 is complete and proceeds to the first brochure distribution point 14 on the brochure inventory route 10. In the preferred embodiment, the driver's handheld device 30 displays the address of the first brochure distribution point 14 and directions on how to get to the first brochure distribution point 14. When the driver 11 arrives at the first brochure distribution point 14, the driver 11 inputs that fact into the handheld device 30. The handheld device 30 records in memory 2 the times the driver 11 arrives and leaves each location, including the distribution center 26 and each brochure distribution point 14, 16, 18, and 20. This is accomplished in one embodiment by recording the time when the driver 11 inputs his or her arrival and departure at each location. Alternatively, the handheld device may include a global positioning system (GPS) capable of determining where the handheld device is located in relation to roadways and buildings. Thus, in preferred embodiments, the handheld device 30 records the time of arrival and departure at a particular location without relying on the driver 11 to input the arrival and departure times. Furthermore, in preferred embodiments, the handheld device is capable of recording the times a driver 11 veered off the brochure inventory route 10 and the locations the driver 11 visited in such a detour from the prescribed brochure inventory route 10.

Referring now to FIG. 1C, once the driver 11 arrives at a brochure distribution point 14, 16, 18, or 20, the driver 11 examines the brochure racks 24 to determine the approximate quantity of brochures 22 contained within each brochure bin 36 on each brochure rack 24. The brochure rack 24 shown in FIG. 1C is meant merely for illustrative purposes, and many different variations of brochure racks 24, brochure bins 36, and brochures 22 may be used. Particularly, a brochure bin 36 may be any size or shape in order to accommodate any size, quantity, and identity of brochure 22. Furthermore, a brochure rack 24 may have only one brochure bin 36 or may have many brochure bins 36 arranged in a wide variety of patterns.

The brochure quantity determination is preferably performed in relation to the approximate capacity of each brochure bin 36 so that a percentage value is estimated. For example, the driver 11 perceives that a brochure bin 36 is approximately half full of brochures 22 and assigns that brochure bin 36 an estimated brochure level of 50%. Similarly, if the driver 11 estimates the brochure bin 36 is one-third full, then the driver 11 assigns an estimated brochure level of 33%. The driver then inputs the estimated brochure level for each brochure bin 36 on each brochure rack 24 at the present brochure distribution point 14, 16, 18, or 20. When the driver 11 is finished assigning estimated brochure levels 38 for each brochure bin 36 and each brochure rack 24 at a particular brochure distribution point 14, 16, 18, or 20, the driver 11 returns to the vehicle 12, and the handheld device 30 displays detailed information describing the identity and quantity of brochures 22 necessary to replenish the supply of brochures 22 at the present brochure distribution point 14, 16, 18, or 20. The identity and quantity information is preferably stored in the memory 2 of the handheld device 30, but may also be stored in the memory 3 of the server 35 and communicated to the handheld device 30 as necessary. This allows the driver 11 to accurately and efficiently collect the necessary brochures 22 from the vehicle 12 and install them at the proper brochure rack 24 in the proper brochure bin 36. The driver 11 then returns to the vehicle 12 and inputs a distribution point complete command into the handheld device 30.

Next, the handheld device 30 outputs the address and directions to the next brochure distribution point 14, 16, 18, or 20, which in our present example, would be brochure distribution point 16. The inventory process of examining the brochure bins 36 in each brochure rack 24, formulating an estimated brochure level 38 for each, inputting such estimated brochure levels 38 into the handheld device 30, and supplying the brochures 22 to the proper brochure bins 36 is repeated at each brochure distribution point 14, 16, 18, and 20.

Upon completing the entire brochure inventory route 10, the driver 11 synchronizes the handheld device 30 with the server 35. In the preferred embodiment, the information transferred includes the brochure racks 24 serviced, the number of brochures placed on each brochure rack 24 and in each brochure bin 36, and the time information relating to all event performed on the entire route. The time information allows the managers to determine how much time was spent driving between brochure distribution points 14, 16, 18, and 20 and the distribution center 26 and how much time was spent at each brochure distribution point 14, 16, 18, and 20 refilling brochure racks 24.

In another embodiment, the handheld device 30 is capable of wireless communication with the server 35. Referring to FIG. 1D, the handheld device 30 runs remote inventory software 32, which is a component of the brochure inventory software 28 and is represented by circle 32 inside block 30. The server 35 runs central inventory software 34, which is also a component of the brochure inventory software 28 and is represented by circle 34 inside server 35. The handheld device 30 and the server 35 communicate via connection 33. The connection 33 may be wireless and constant or wireless and periodic. In one embodiment, the handheld device uploads its data to the server 35 after the driver returns from his/her brochure distribution route 10. In such a case, the handheld device 30 may communicate with the server 35 by way of infrared. USB, USB2.0, IEEE 1394 (Firewire), serial optical, or any other type of wired communication. In another preferred embodiment, the device 30 communicates with the server 35 via a cellular or other wireless connection 33.

When the handheld device 30 is communicating with the server 35 wirelessly, it communicates substantially instantaneously with the server 35 in order to relay inventory information including driver 11 location, time between brochure distribution points 14, 16, 18, and 20, and brochures 22 supplied to each brochure bin 36 on each brochure rack 24 at each brochure distribution point 14, 16, 18, and 20. This would benefit managers at the distribution center in that new brochure inventory routes 10 could be formulated for the driver 11 should the driver be on pace to return to the distribution center 26 before scheduled. In one embodiment, if the driver 11 was behind schedule on his or her current brochure inventory route 10, the server 35 removes specific brochure distribution points, for example distribution point 20, from the driver's 11 brochure inventory route 10 and adds such removed brochure distribution point 20 to another driver's 11 brochure inventory route 10. Thus, changes in brochure inventory routes 10 could be made in real time as drivers 11 progress through their brochure inventory route 10 so that each driver's 11 time is spent most efficiently. In this embodiment, each driver 11 carries a supply of brochures sufficient to supply brochure distribution points in addition to the brochure distribution points contained in his or her original brochure inventory route 10.

Referring now to FIG. 1E, an important aspect of the brochure inventory tracking system is the brochure inventory software 28. Both the remote inventory software 32 and the central inventory software 34 are capable of accessing a database 37 containing data indicative of the quantity and identity of brochures distributed in each brochure bin 36 at each brochure rack 24 at each brochure distribution point 14, 16, 18, and 20. Such information is available for each instance when a driver 11 inspects a brochure bin 36 and is used in a variety of ways by the brochure inventory software 28. For example, the brochure inventory software 28 can analyze the data detailing the number of brochures 22 supplied to a specific brochure bin 36 over a period of time, for example, one (1) year. A specific brochure distribution point, for example distribution point 14, may be assigned to a brochure inventory route 10 once every month for a year. If the driver 11 inputs into the handheld device 30 that a specific bin 36, on average, has an estimated brochure level 38 of 90%, then the brochure inventory software 28 is able to determine that specific brochure bin 36 does not require refilling as frequently as once a month.

However, if another brochure bin 36 has an estimated brochure level 38 of 15%, then the brochure inventory software 28 is able to determine that the specific brochure bin 36 may require refilling more frequently. Alternatively, the brochure inventory software 28 may communicate to the vendor of the brochure bin 36 the popularity of the brochure 22 being distributed in that brochure bin 36 at that specific brochure distribution point 14 and suggest the vendor purchase another brochure bin 36 for that specific brochure 22 at that brochure distribution point 14. Such communication from the brochure inventory software 28 to a vendor may occur continuously or periodically with regard to all the vendor's purchased brochure bins 36 or may occur only when certain events occur, for example when the estimated brochure level 38 of a brochure bin 36 drops below a certain predetermined level, for example 20%, or in the previous example, when the estimated brochure level 38 is averaged over a number of deliveries and is below a pre-determined level.

Similarly, the brochure inventory software 28 may communicate with a vendor or customer if the estimated brochure level 38 of a brochure bin 36 or if the average of a number of estimated brochure levels 38 is higher than a pre-determined level. Such communication may occur by the brochure inventory software 28 on the handheld device 30 or the server 35 transmitting a message including information related to the vendor's brochure bins 36 via e-mail or uploading such message on an Internet website. This communication may be done automatically or, alternatively, only at the direction of the driver 11 or a manager at the distribution center 26. This allows a vendor to remove a specific brochure bin 36 from one brochure distribution point, for example brochure bin 14 and install a brochure bin 36 in another brochure distribution point, for example brochure bin 16. The determination to "move" a brochure bin 36, essentially transferring a lease on a brochure bin 36 at one brochure distribution point 14 to a brochure bin 36 at another brochure distribution point 16, in such a case, is based on information relating to the success of similar identities of brochures 22 as the one being transferred at the new brochure distribution point 16 when compared to the previous brochure distribution point 14. This type of immediate vendor information and possible interaction is governed by the agreements entered into between the vendor and the distribution center. For example, the ability to "move" a brochure bin 36 from one brochure distribution point 14 to another brochure distribution point 16 is preferably a bargained for right within the vendor-distribution center agreement.

As shown in FIG. 1E, the preferred embodiment of the brochure inventory software has two major components: the remote inventory software 32 and the central inventory software 34. As discussed above, the remote inventory software 32 is preferably loaded onto a driver's 11 handheld device 30. When the remote inventory software is loaded onto a driver's 11 handheld device 30 it is referred to as the driver/handheld inventory software 32*a*. The remote inventory software 32 is also preferably used by a customer from a remote computer 31 by way of an Internet connection 29. When the remote inventory software 32 is used by a customer in such a way, it is referred to as customer inventory software 32*b*.

In one embodiment the driver/handheld inventory software 32*a* and the customer inventory software 32*b* are identical programs, which are accessed via user name and password. In such a case, the remote inventory software 32 associates the username and password with a corresponding clearance level and only the portions of the remote inventory software 32 associated with the clearance level are provided to the user for access. For example, a driver would have access to route information corresponding to his/her route, whereas a customer would have access to inventory information regarding the customer's brochure bins. Alternatively, the driver/handheld inventory software 32*a* provided to a driver 1 only includes software capable of accessing the portions necessary for the driver 11 to do his/her job regardless of the username/password entered. One portion of the driver/handheld inventory software 32*a* provides for the entering of the estimated brochure levels 38, which is shown as a subpart in FIG. 1E.

In a preferred embodiment, the brochure inventory software 28 allows access to brochure inventory information over a communication network, such as the Internet, for all parties involved, including the vendors, the distribution center managers, and the drivers. Of course, in a preferred embodiment discussed above, the handheld devices 30 carried by all drivers 11 are in constant wireless communication with the server 35. Thus, any vendors, managers, or drivers needing access to brochure inventory information may gain access to nearly real-time information over the Internet. In a preferred embodiment, this access could be limited as determined by the distribution center managers. For example, if the managers entered a contractual agreement with a vendor whereby the vendor has access to information related to its brochure bins 36, then the vendor is assigned a user name and password in order to access only that information related to that vendor's brochure bins 36. Similarly, the distribution center managers may wish to have Internet access to all the information relating to every brochure bin 36 and, therefore, the user name and password assigned to such managers grants such comprehensive access. Furthermore, a driver 11 may be granted access only to such information as necessary for the driver 11 to successfully and efficiently carry out his or her job, for example access to regularly updated brochure inventory routes 10.

In another embodiment, where the handheld devices 30 do not communicate wirelessly, but rather, must be synchronized with the server 35 after every brochure inventory route 10 is completed, brochure inventory routes 10 may not easily be altered while the driver 11 is en-route. However, this setup provides some advantages such as a reduced tendency for a driver 11 to loiter or waste time while on the job. Particularly, if a driver 11 is paid based on the number of jobs he or she completes and not on an hourly basis, the driver 11 would be more inclined to perform efficiently and therefore complete the inventory tasks at more brochure distribution points 14, 16, 18, and 20 than he or she would otherwise.

Figure 2:
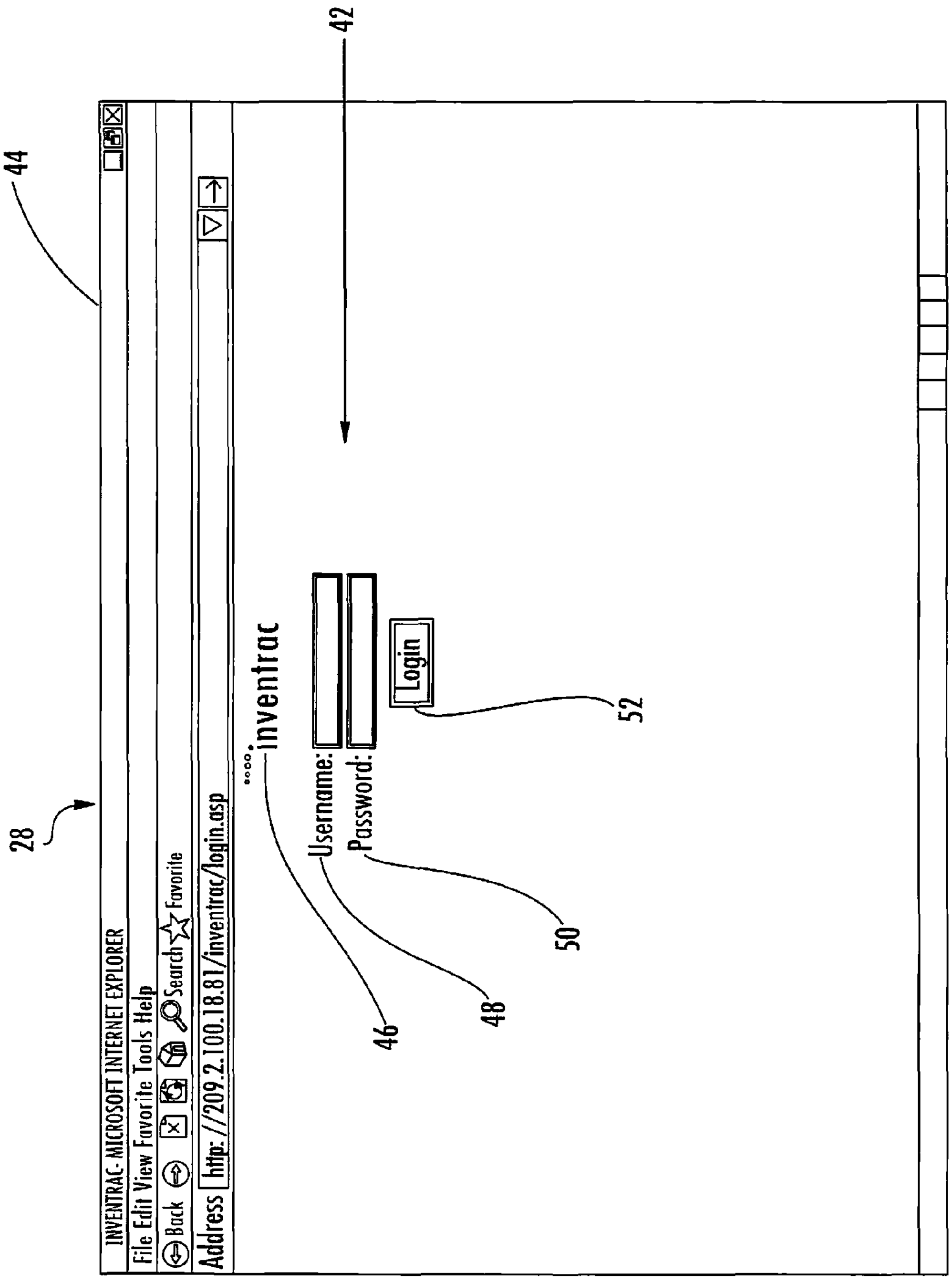
FIG. 2 is a screenshot of the logon page of the brochure inventory software.

Referring now to FIG. 2, a computer screenshot 40 of a logon page 42 generated by a preferred embodiment of the brochure inventory software 28 is shown. In this embodiment, the brochure inventory software 28 is accessed through the Internet in an Internet browser window 44. The version of the brochure inventory software 28 may be representative of the remote inventory software 32 and/or the central inventory software 34 or portions of either. However, various other embodiments of the driver/handheld inventory software 32*a*, the customer inventory software 32*b*, and the central inventory software 34 are contemplated, and the embodiment of FIGS. 2-16 is shown for illustration purposes only. The logon page 42 includes a software mark 46 at the top of the page, followed by a username box 48, a password box 50, and a login button 52. This remote access configuration allows any person assigned a username and password to access the brochure inventory software remotely. The distribution center managers, as discussed above, may determine the level of access to be allowed for any given person, whether he or she is a driver, a vendor, or a manager. Thus, a username and password is associated with a certain level of access to the information available in the brochure inventory software 28. For example, a driver 11 may only have access to information regarding the brochure inventory route 10 the driver 11 is assigned. Furthermore the driver 11 would preferably not have the ability to alter any information contained in the brochure inventory software 28. An authorized user may enter a valid username and password to gain access to the welcome page 54, shown in FIG. 3.

Figure 3:
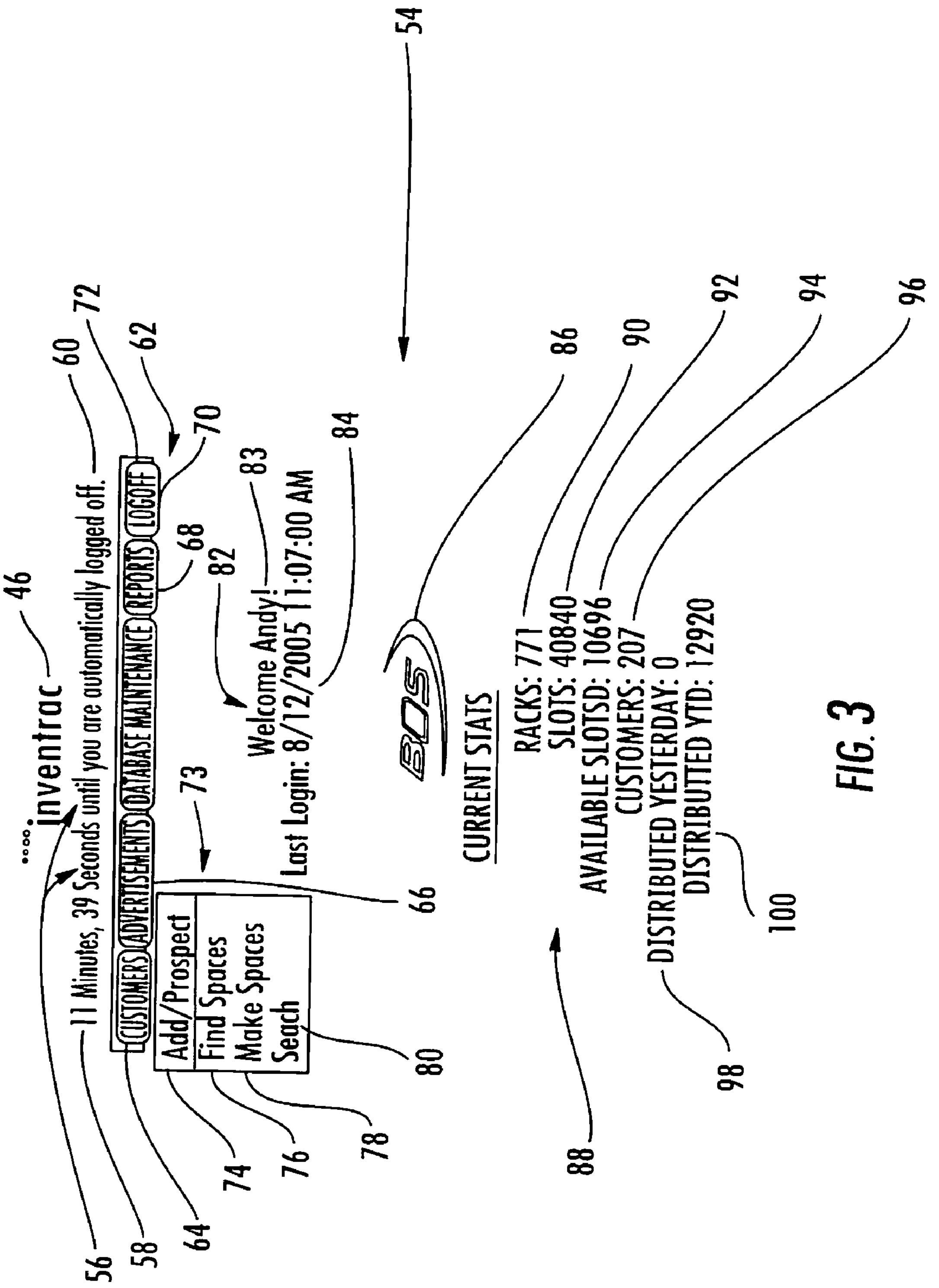
FIG. 3 is a screenshot of the welcome page of the brochure inventory software.

Referring now to FIG. 3, the welcome page 54 is shown. The Internet browser window 44 has been removed from the figure in order to facilitate easier understanding of the brochure inventory software 28. It should be understood that the Internet browser window 44 remotely accessing the brochure inventory software 28 or another program running on a computer with a direct connection to the brochure inventory software 28 and the information contained therein is necessary to produce the screenshots shown in the several figures. Underneath the software mark 46 is the automatic logoff indicator 56, which provides a countdown timer 58 and a statement 60 informing the user he or she will be logged off of the brochure inventor) software 28 when the countdown timer 58 expires. In the preferred embodiment, the automatic logoff indicator 56 appears on every page of the brochure inventory software 28 once the user is logged in.

Underneath the automatic logoff indicator 56 is the menu bar 62, which includes the following menu headings: Customers 64, Advertisements 66, Database Maintenance 68, Reports 70, and Logoff 72. By clicking on each of the menu headings, or alternatively, by placing the computer cursor over one of the menu headings, a drop-down menu 73 will appear. As shown in FIG. 3, the Customer menu heading 64 has been chosen and the drop-down menu 73 includes the following options: Add/Prospect 74, Find Spaces 76, Move Spaces 78, and Search 80. Underneath the menu bar 62, is the welcome statement 82 which includes the word "Welcome" followed by the username of the logged-in user 83. Directly below the welcome statement 82 is the last login statement 84, which includes the date and time of the last login of the currently logged-in user. Below the last login statement 84 is the company mark 86, which in this case is the software provider. In alternative embodiments, the company mark 86 is a mark associated with the logged-in user 83, for example a particular vendor known as Made-Up may have a manager using the username JohnDoe. In this hypothetical situation, when JohnDoe logs onto the brochure inventory software 28, the company mark 86 associated with JohnDoe. "Made-Up," would appear below the last login statement 84 on the welcome page 54. Underneath the company mark 86, is a summary of the current stats 88 including the following values: Racks 90, Slots 92, Available Slots 94, Customers 96, Distributed Yesterday 98, and Distributed YTD (year to date) 100.

Figure 4A:
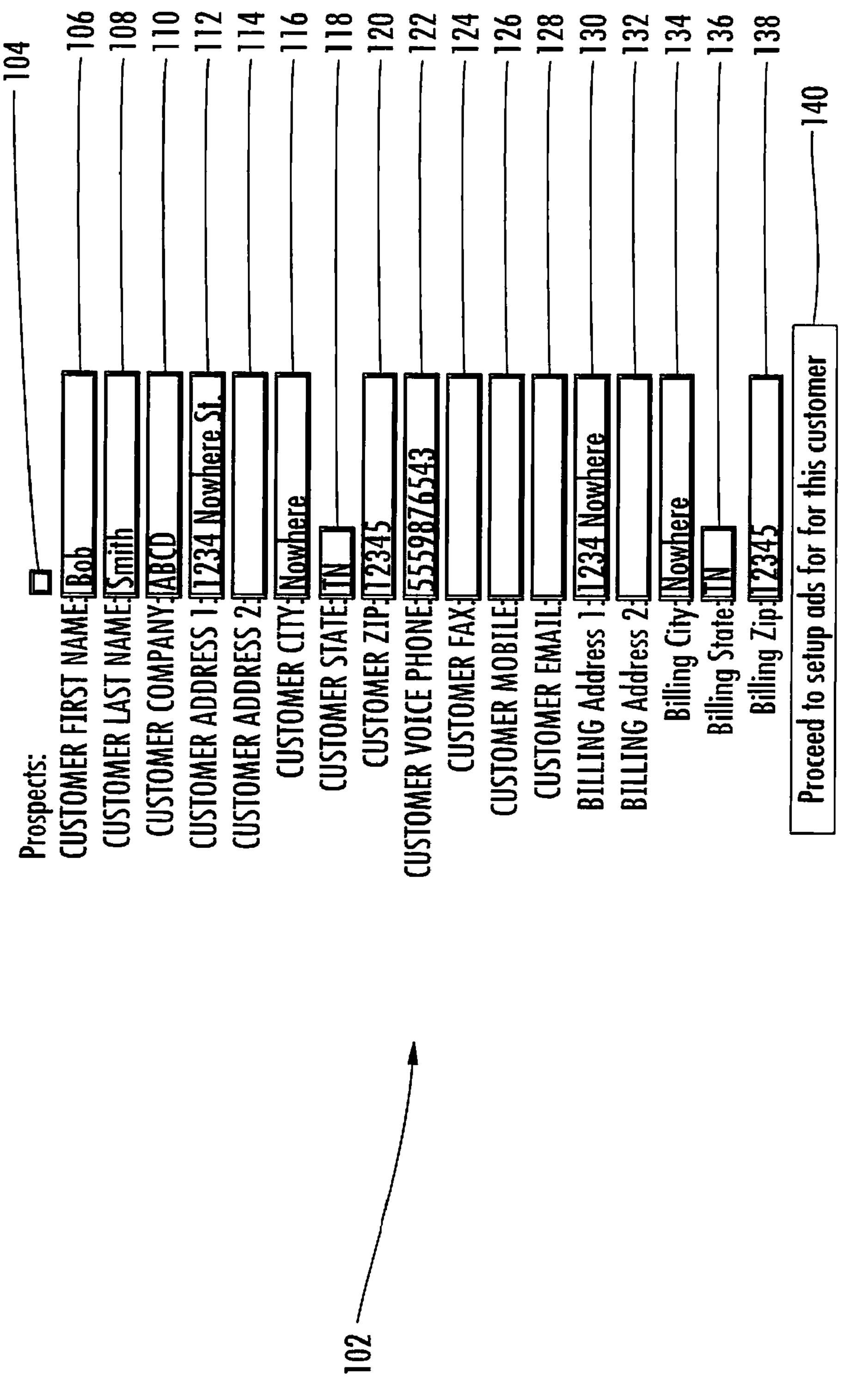
FIGS. 4A, 4B, and 4C are screenshots of the customer add/prospect option of the brochure inventory software.

By clicking on Add/Prospect 74 in the Customer menu heading 64, the user is taken to a customer data entry screen 102 as shown in FIG. 4A. Note that the software mark 46, the automatic logoff indicator 56, and the menu bar 62 are not shown in many of the figures illustrating the brochure inventory software 28. These components are left out for ease of explanation to simplify the figures. It is intended that these components may be present on each screen of the brochure inventory software 28 or may be absent on any number of such screens in different embodiments.

The customer data entry screen 102 consists several data entry fields including: Prospect 104, Customer First Name 106, Customer Last Name 108, Customer Company 110, First Customer Address Line 112, Second Customer Address Line 114, Customer City 116, Customer State 118, Customer Zip 120, Customer Voice Phone 122, Customer Fax 124, Customer Mobile 126, Customer Email 128, First Billing Address Line 130, Second Billing Address Line 132, Billing City 134, Billing State 136, and Billing Zip 138. Immediately below the data entry fields is the Setup Ads Button 140.

Figure 4B:
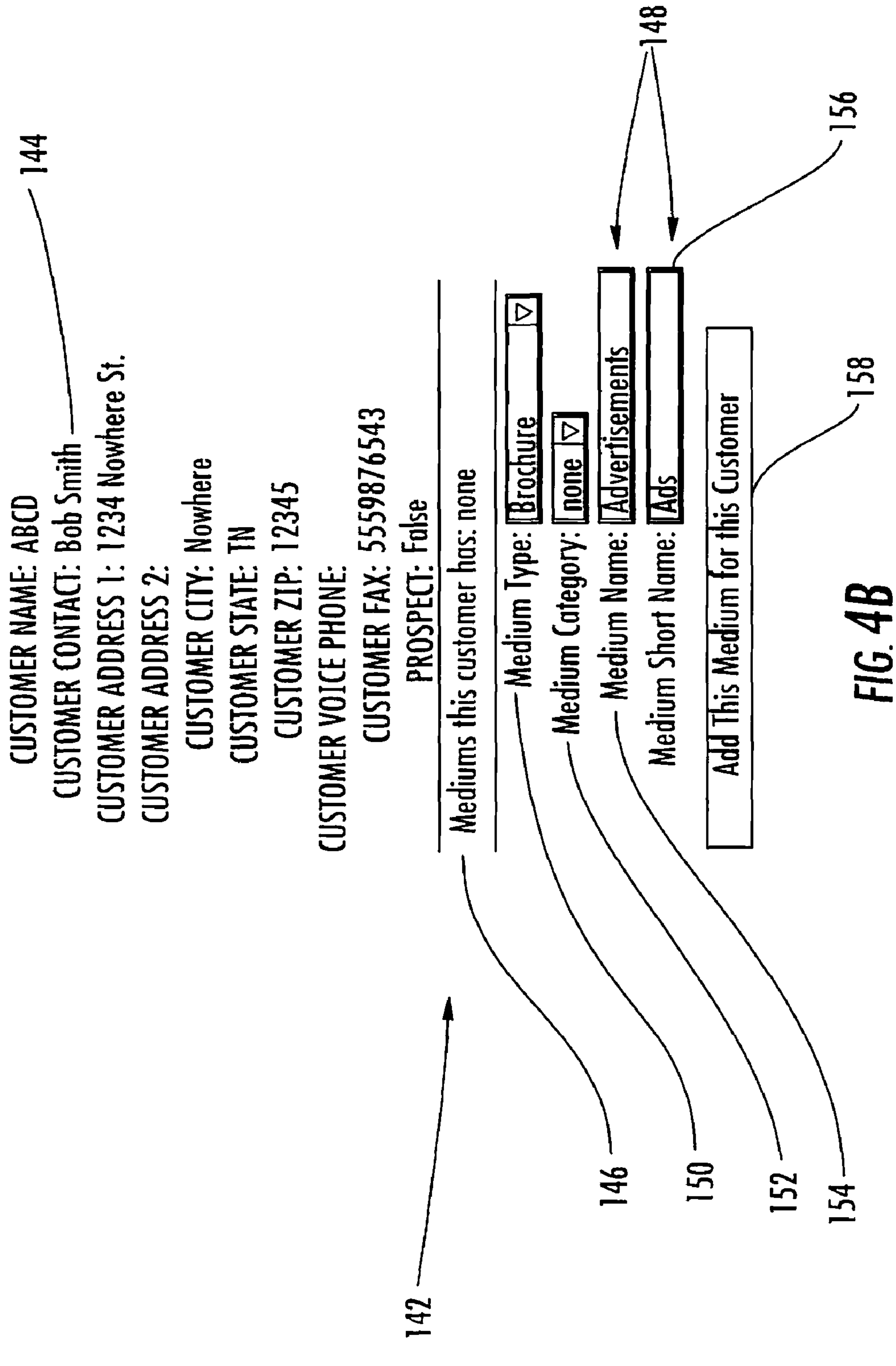
Figure 4C:
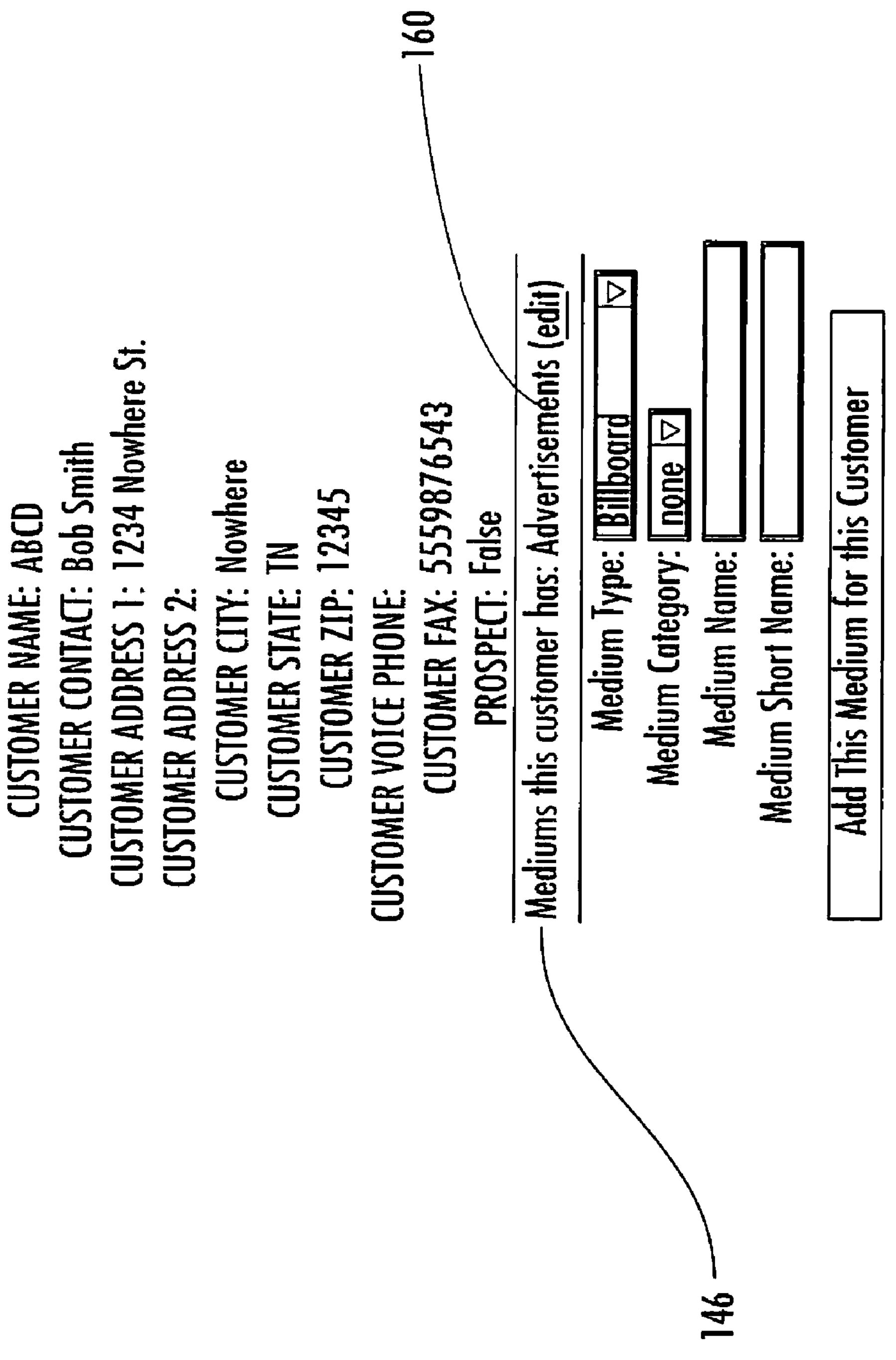

Clicking on the Setup Ads Button 140 of the customer data entry screen 102 navigates the user to the add medium screen 142 as shown in FIG. 4B. This screen lists much of the information entered by the user in the data entry fields, for example the Customer Contact 144, which is a combination of the data entered in the Customer First Name 106 and the Customer Last Name 108 data entry fields of the customer data entry screen 102. The add medium screen 142 next lists the media the current user has available on the media available line 146. Below the media available line are medium data entry fields 148 for entering data corresponding to a particular medium such as the Medium Type 150, the Medium Category 152, the Medium Name 154, and the Medium Short Name 156. Below the medium data entry fields is the add medium button 158. When the user clicks on the add medium button 158, the brochure inventory software 28 adds the specified medium and associates such medium to any data that was entered in the medium data entry fields 148. As shown in FIG. 4C, the media available line includes the medium titled "Advertisements" 160, which is the medium created as shown in FIG. 4B. The edit button 162 located next to the "Advertisements" medium 160 listing links the user back to an edit medium screen 164 (not shown), which is very similar to the add medium screen 142 in that the data associated with a medium can be changed.

Referring now to FIG. 5A, the find spaces screen 166 is shown. The purpose of the find spaces screen 166 is to allow a user, most often a vendor (or customer), to search for available i.e. empty, brochure bins 36. To navigate to the find spaces screen 166, a user must click on the Find Spaces 76 option in the drop-down menu 73 associated with the Customers heading 64. The find spaces screen 166 informs the user that he or she can "Search for open spaces by any combination of the following:" and provides four distinct boxes 168, 170, 172, and 174 for choosing space criteria. First, the route box 168 allows the user to choose particular brochure inventory routes 10 to search. Second, the traffic rating box 170 allows the user to choose the level of traffic to search for. Third, the location box 172 allows the user to choose a type of location to search for an open brochure bin 36. Fourth, the city box 174 allows the user to search only in particular cities. The check all fields 178 allow the user to check all of the available choices without having to individually check each available choice in a given box. Thus, if a user wanted to search for available brochure bins 36 in all cities, the user would simply have to click on the check all field 178 in the city box 174. By clicking on the search button 176, the brochure inventory software takes the user to the search results screen 180.

Figure 5B:
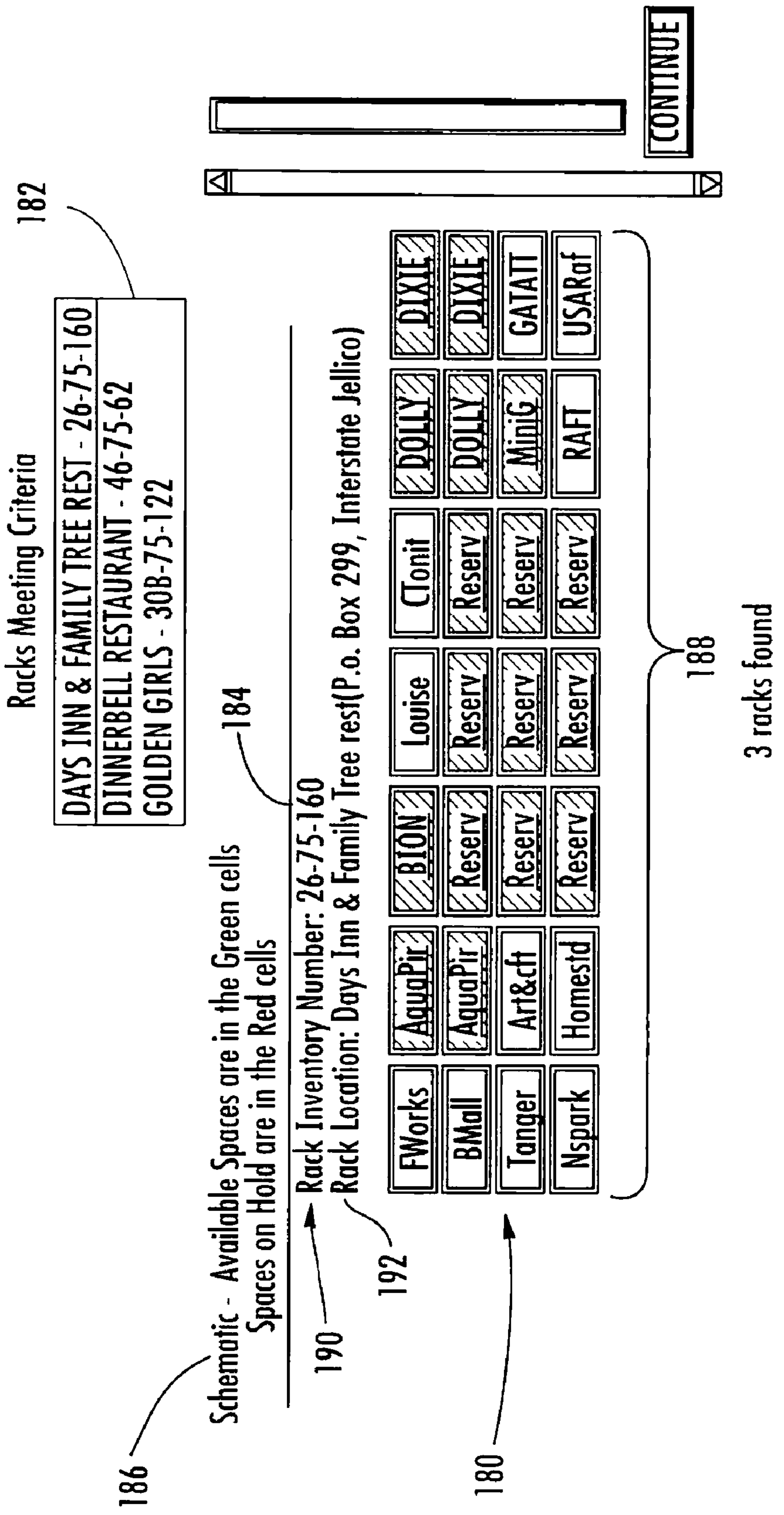

The search results screen 180 is shown in FIG. 5*b*. At the top of the search results screen 180 the "racks meeting criteria" box 182 lists the brochure racks 24 meeting the criteria entered by the user in the find spaces screen 166. The search results shown could include multiple brochure racks 24 at one location or brochure distribution point 14, and therefore each brochure rack 24 is assigned a rack inventor number 184. For example, the first listing in the "racks meeting criteria" box 182 is "Days Inn & Family Tree rest—26-75-160." In this search result, the rack inventory number 184 "26-75-160" is unique to one particular brochure rack 24. Thus, if another brochure rack 24 was placed at the same brochure distribution point 14 or location, the brochure distribution point 14 name would be identical to the above listing, but the rack inventory number 184 would be distinctive. A user is able to scroll through the "racks meeting criteria" box 182 in order to choose a particular brochure rack 24 to inspect. Below the "racks meeting criteria" box 182 is the search results key 186, which explains the coloring of the brochure rack representation 188. In this embodiment, the available brochure bins 36 are colored green (or dark in the figure) and the brochure bins that are on hold (unavailable) are colored red (or light in the figure). The brochure rack information line 190 is located below the search results key and includes the rack inventory number 184 and the rack location 192. The rack location 192 includes the brochure distribution point identification, for example "Days Inn & Family Tree rest" and the address of the brochure distribution point, for example "P.O. Box 299, Interstate Jellico." In other embodiments, the brochure inventory software 28 is programmed to display any information stored in the brochure inventory software 28 and relating to a particular brochure rack 24.

Figure 5C:
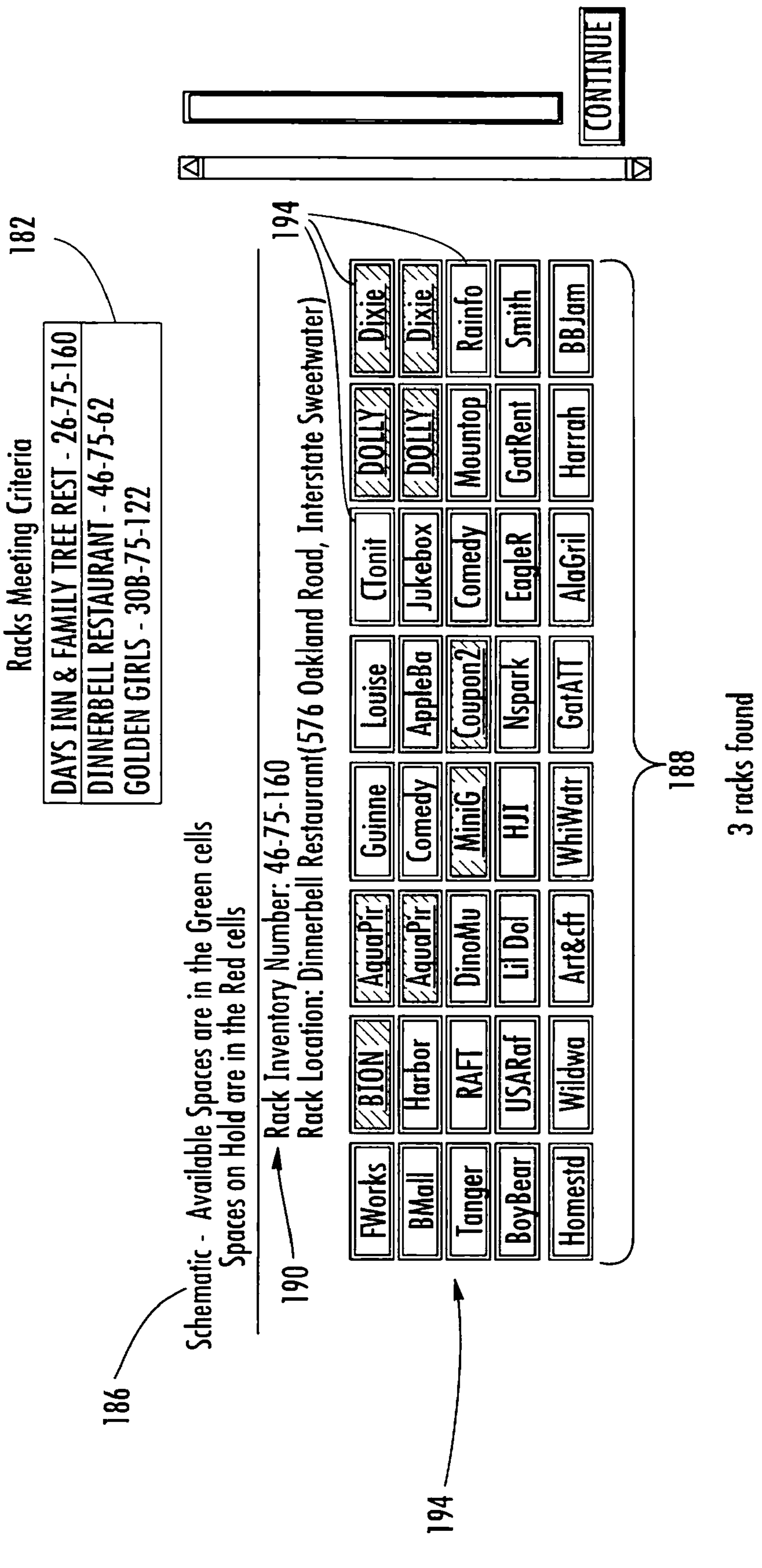
Figure 5D:
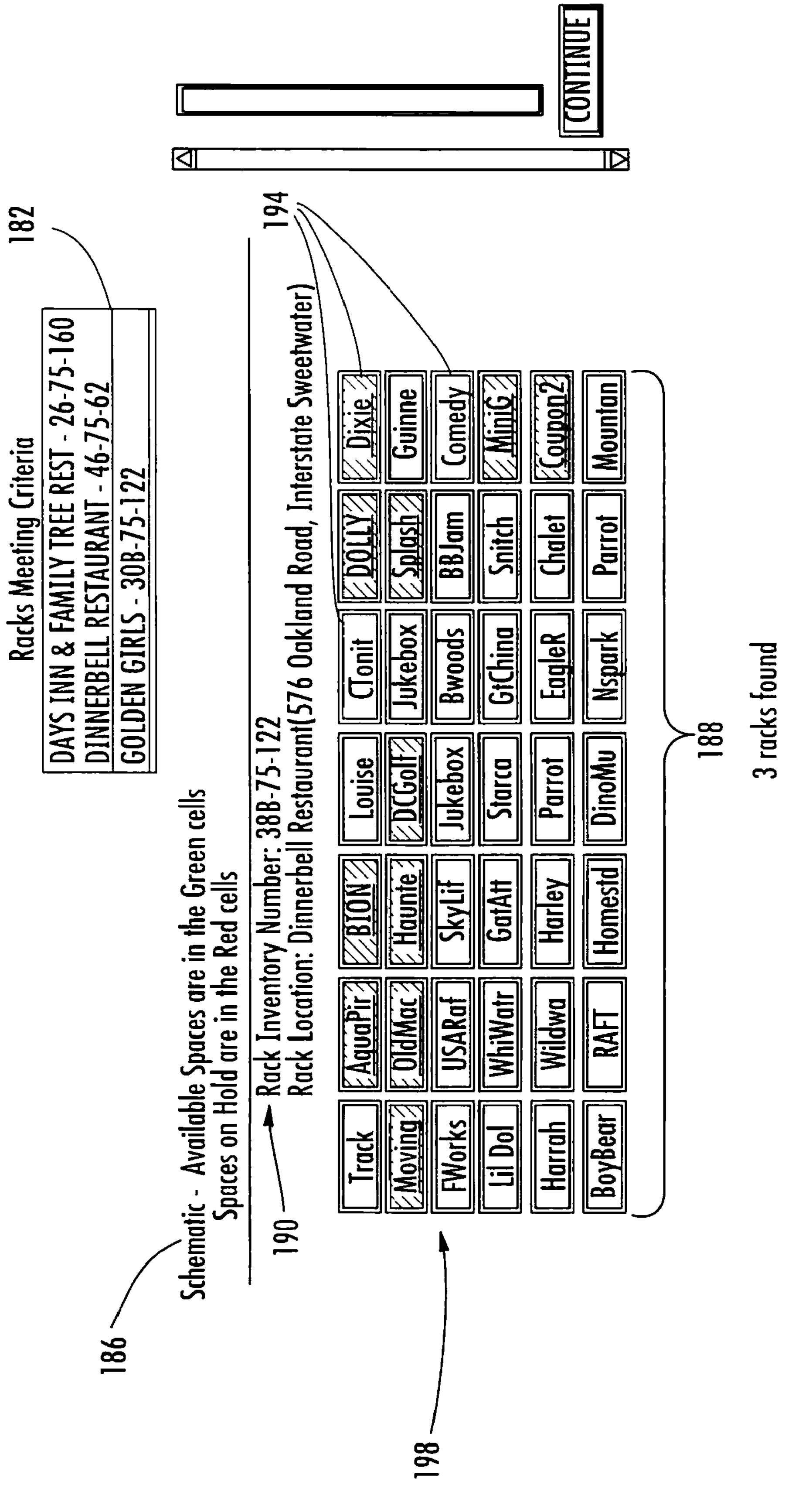

The brochure rack representation 188 is illustrative of the visual layout of an actual brochure rack 24. Thus, the brochure rack representation 188 provides an easy to understand interface for searching, viewing, and manipulating brochure bins 36 and brochure racks 24. FIG. 5C depicts a second search results screen 194 which includes the rack inventory number 184 and the rack location 192 corresponding to the second search result in the "racks meeting criteria" box 182, or "Dinnerbell Restaurant—46-75-62." As can be seen by comparing the brochure rack representations 188 of FIGS. 5B and 5*c*, the size and shape are different. Thus, the brochure inventory software 28 is capable of representing numerous shapes and sizes of brochure racks 24 including various numbers of brochure bins 36 by using graphical representations including brochure bin representations 194 organized in the same general shape and pattern of the actual brochure rack 24 being represented by the brochure rack representation 188. FIG. 5D depicts a third search results screen 198 illustrating the information corresponding to the third search result listed in the "rack meeting criteria" box 182.

Figure 6A:
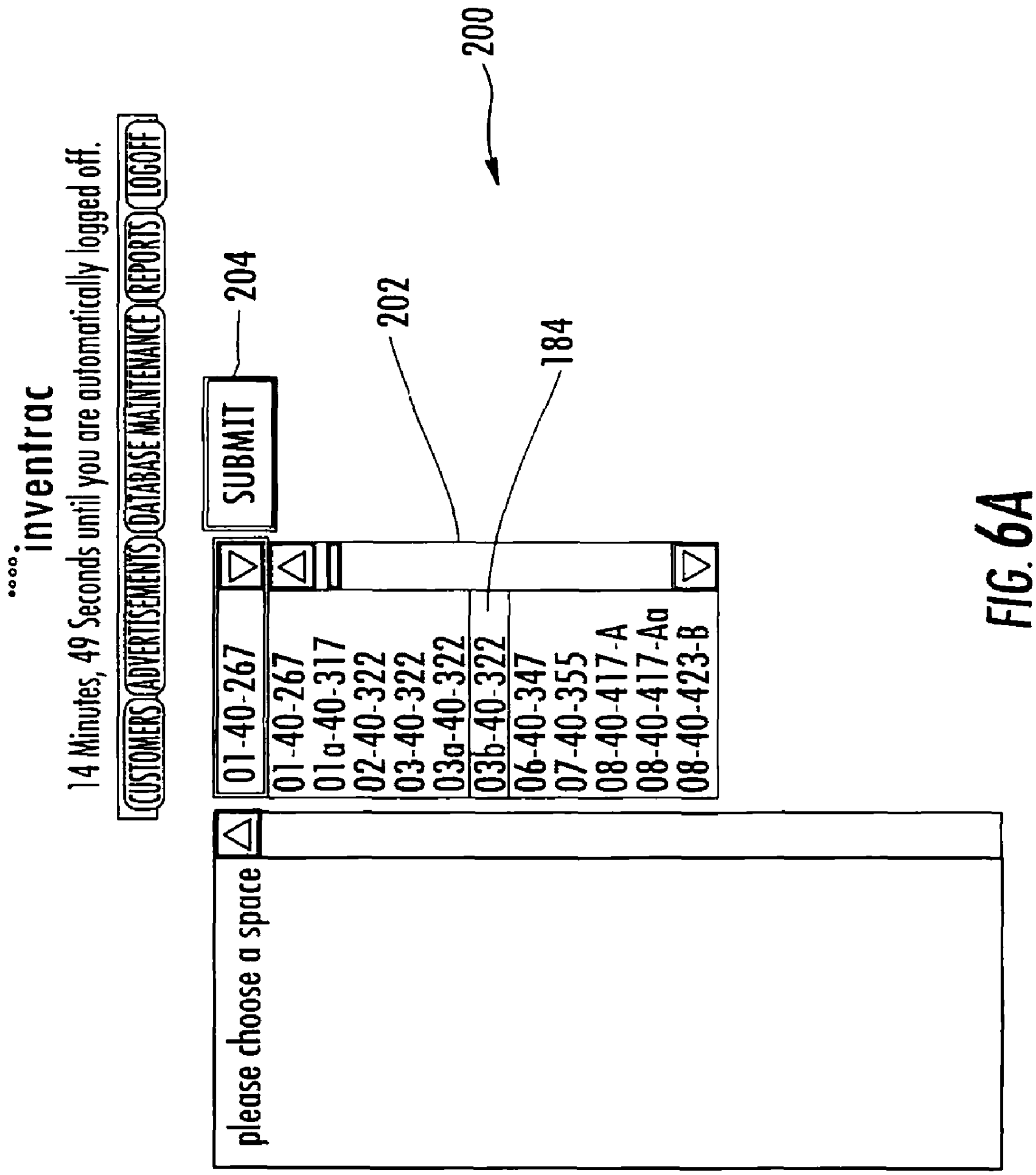
FIGS. 6A, 6B, 6C, and 6D are screenshots of the customer move spaces option of the brochure inventory software.

FIG. 6A shows the move spaces intro screen 200, which is generated when a user clicks on the Move Spaces 78 option in the drop-down menu 73 of the Customer heading 64 on the menu bar 62. The move spaces intro screen 200 allows the user to choose a particular brochure rack 24 by clicking on the appropriate rack inventory number 184 from the rack listing 202 and clicking the submit button 204. After choosing a rack inventory number 184 and clicking the submit button 204, the bin moving screen 206 is displayed.

Figure 6B:
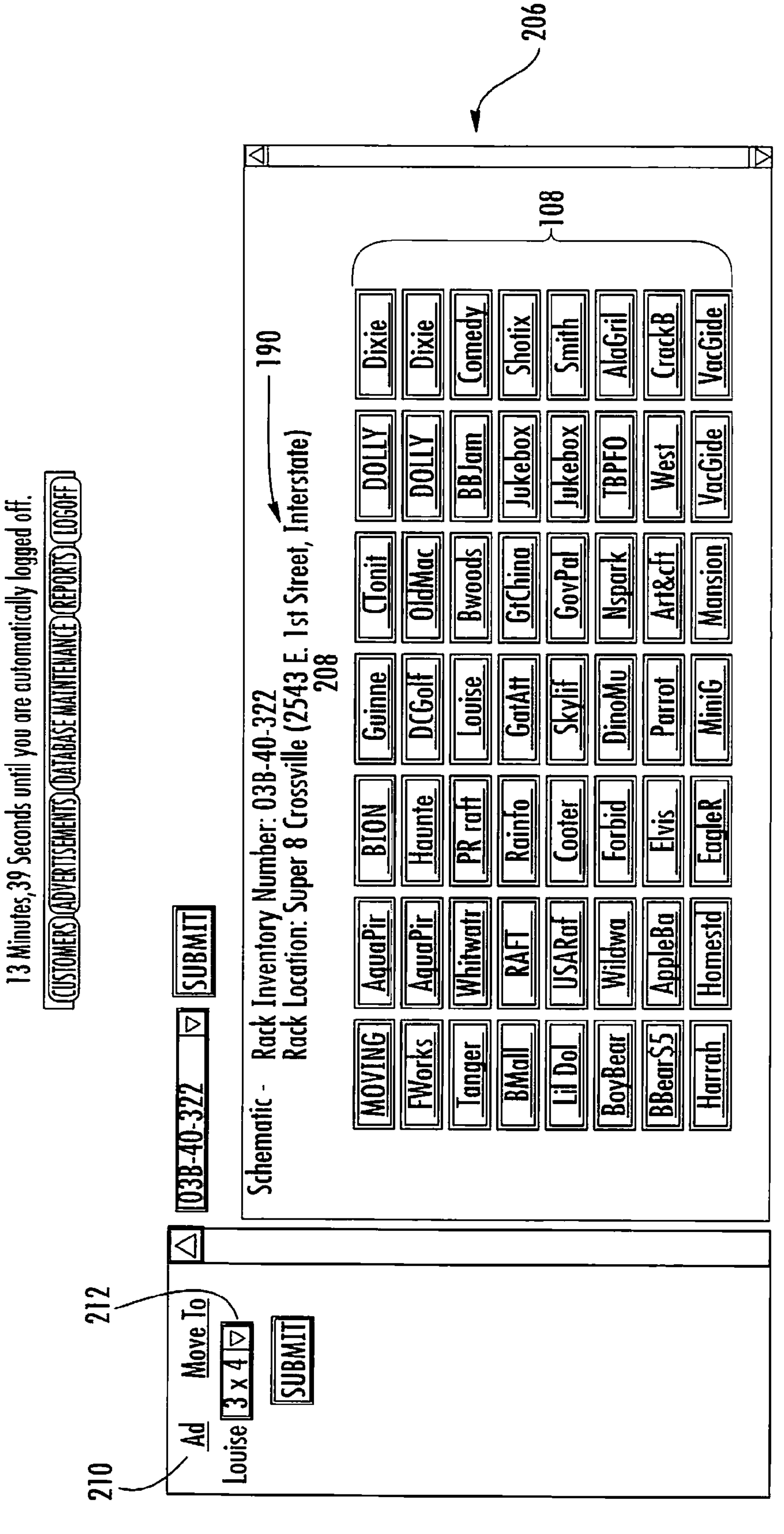
Figure 6C:
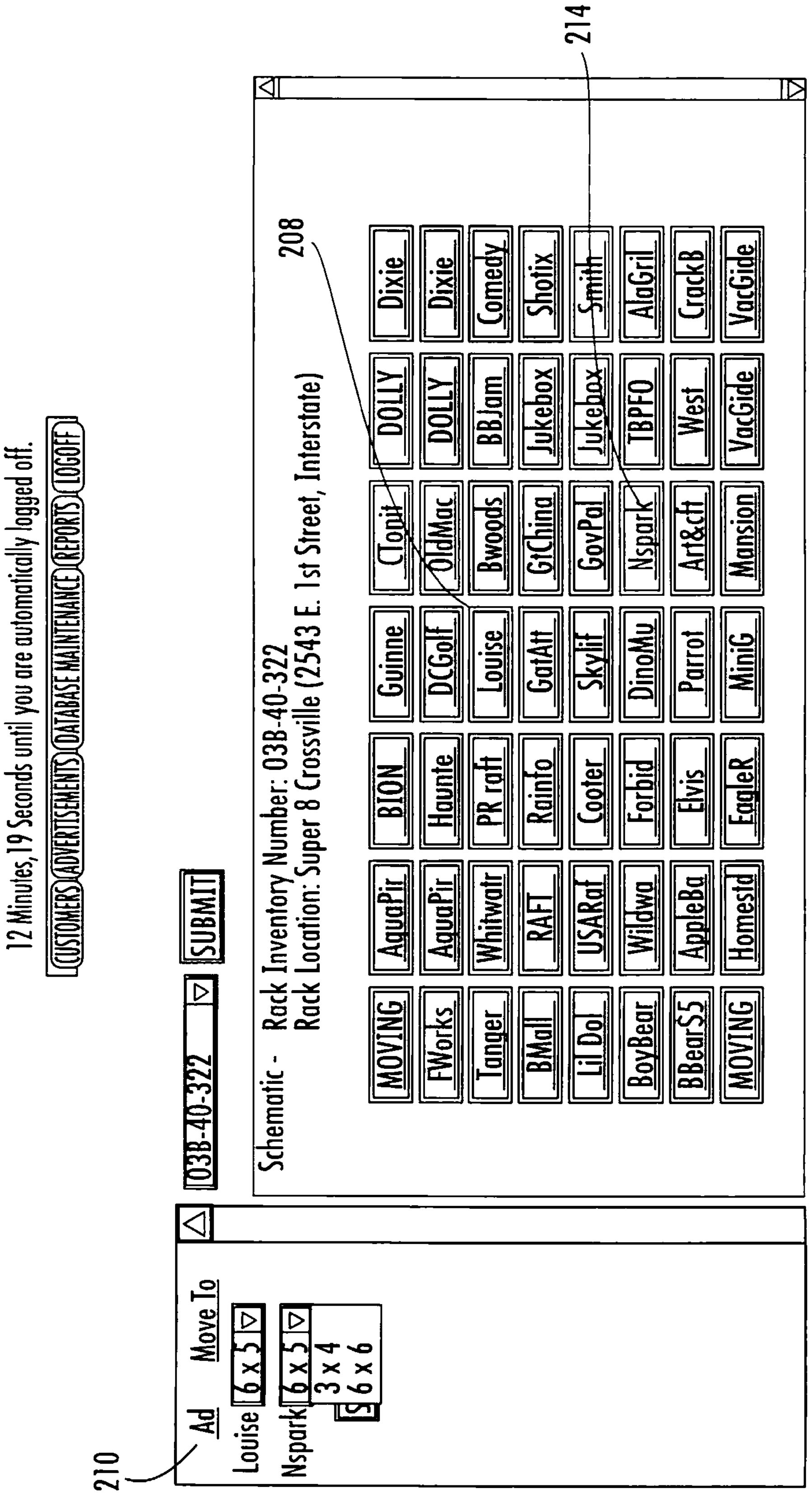
Figure 6D:
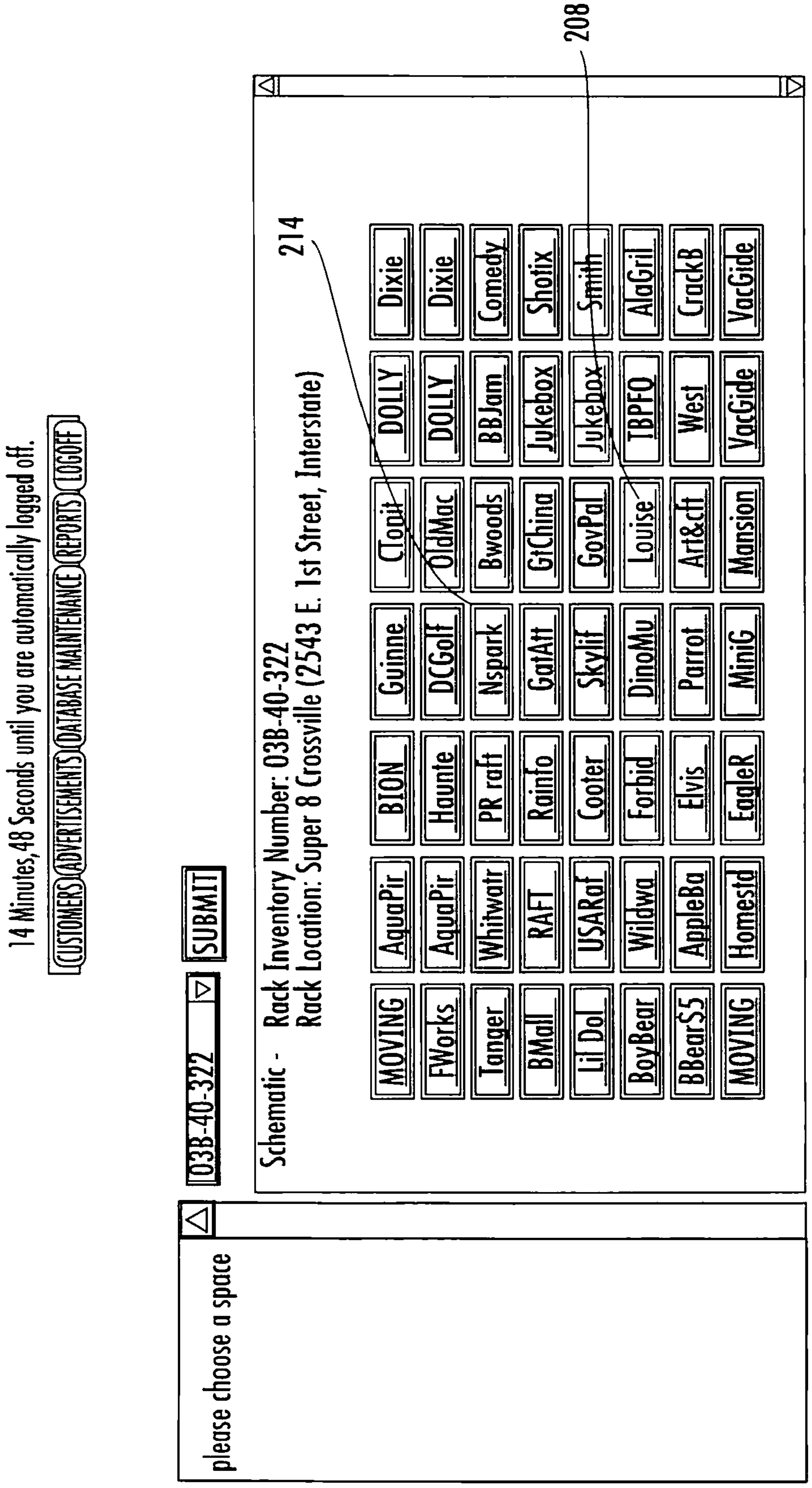

As shown in FIG. 6B, the bin moving screen 206 includes the brochure rack information line 190 and a brochure rack representation 188 corresponding to the particular rack inventory number 184 chosen. The user chooses a brochure bin representation 196, for example the "Louise" brochure bin representation 208 in the brochure rack representation 188 of the bin moving screen 206. On the left-hand side of the bin moving screen 206 is a move-to box 210, which lists chosen brochure bin 36. Louise 208, and has a move-to field 212 for entering the location in the brochure rack representation 188 to which the user intends to move the Louise bin 208. Once the intended location for Louise 208 is entered, the brochure inventory software 28 displays the brochure bin representation 196 corresponding to the location chosen for Louise 208. In this example, the location chosen to move Louise 208 was "6×5," which indicates sixth row from the top and fifth column from the left. The Nspark bin 214 corresponds to that location and therefore Nspark is listed in the move-to box 210. As shown in the move-to field 212, the choices for moving Nspark are "3×4" or "6×5," which are the two locations for the brochure bins 36 already chosen and no others. Once the submit button 216 is clicked, the brochure bin representations 188 switch positions on the brochure rack representation 188 as shown in FIG. 6D.

Referring now to FIG. 7A, the customer company name search page 218 is shown. The customer company name search page 218 is generated when the user clicks on the Search 80 option in the drop-down menu 73 of the Customer heading 64 on the menu bar 62. This provides the opportunity for the user to search for a particular customer company name, for example "ABCD," by entering the customer company name in the customer company name search field 220. By clicking on the search button 222 after entering search terms, the brochure inventory software 28 takes the user to the customer search results page 224 shown in FIG. 7B. The customer search results page 224 includes customer contact information 226 corresponding to the information entered in the customer data entry screen 102 shown in FIG. 4A. Furthermore, the customer search results page 224 provides the number of locations 228 the customer occupies.

Figure 8A:
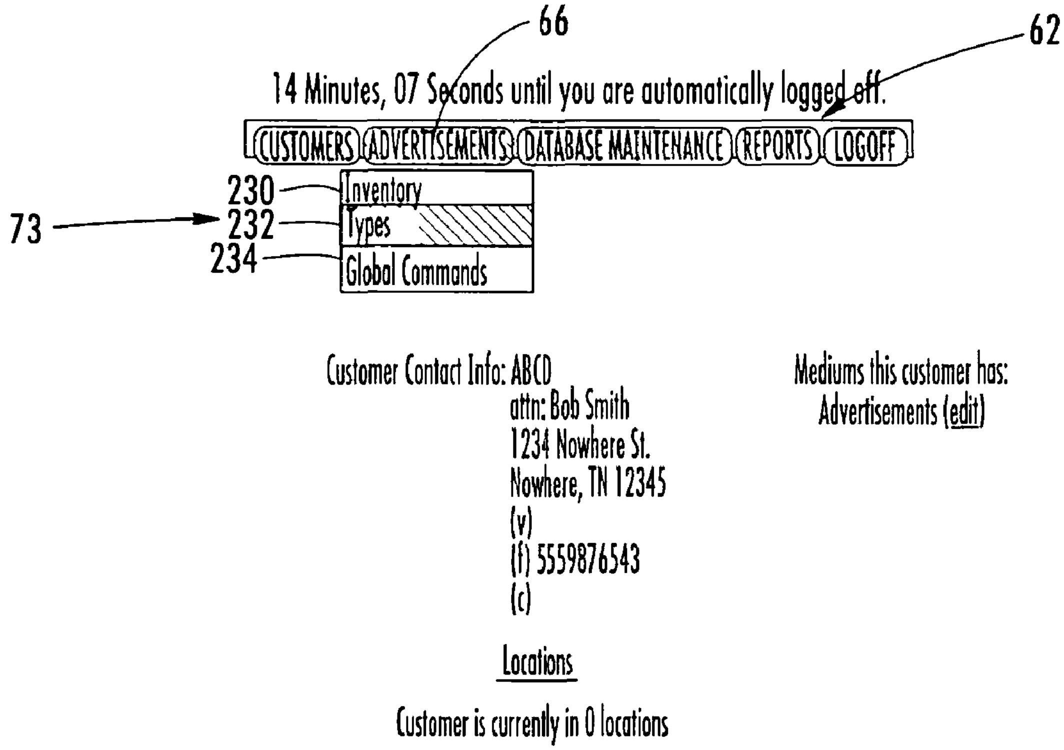
FIGS. 8A, 8B, 8C, and 8D are screenshots of the advertisements types option of the brochure inventory software.
Figure 8B:
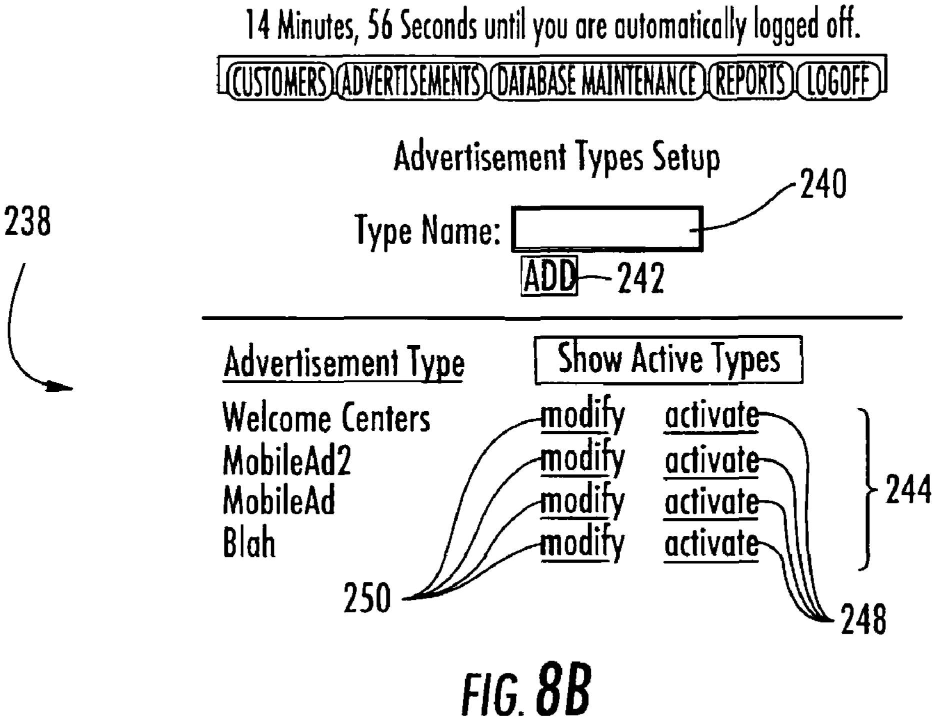
Figure 8C:
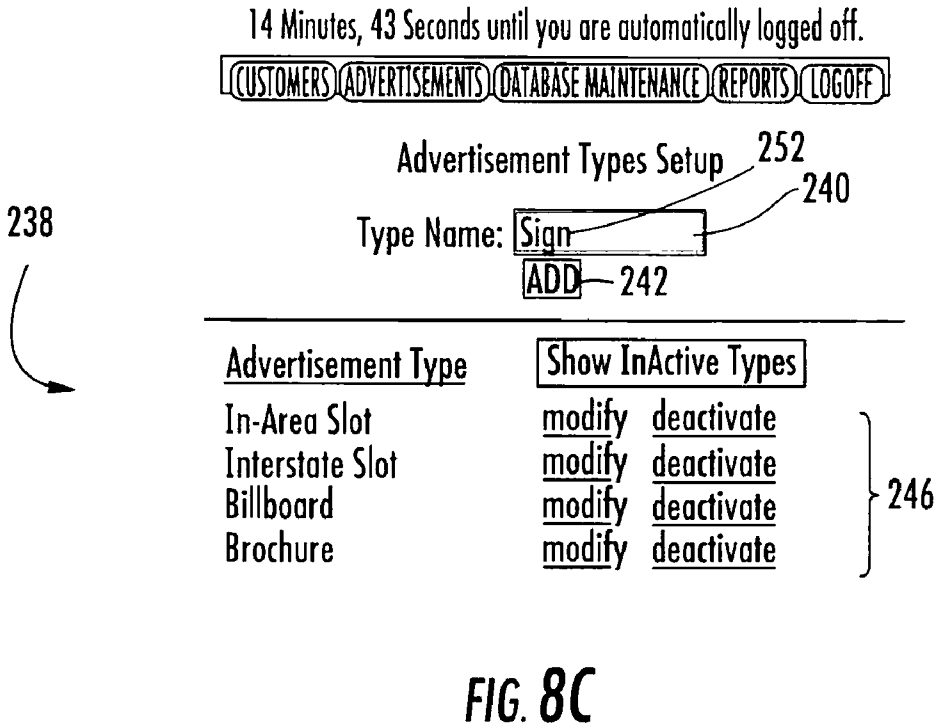

Referring now to FIG. 8A, the drop-down menu 73 corresponding to the Advertisements heading 66 of the menu bar 62 includes the Inventory 230, Types 232, and Global Commands 234 options. In some embodiments, clicking on the Inventory option 230 navigates the user to an Inventory screen where the user may review the number of advertisements currently active. The inventory screen functions as a data retrieval mechanism, whereas the types screen 238, shown in FIG. 8B, functions as a medium whereby the user may manipulate the types and quantity of both active and inactive advertisements. The types screen 238 is generated when the user clicks on the Types option 232 under the Advertisements heading 66. The types screen 238 allows the user to add an advertisement type by entering an advertisement name into the advertisement name field 240 and clicking the add button 242. Referring now to FIGS. 8B and 8C, the types screen 238 also allows the user to see both the inactive advertisement types 244 and the active advertisement types 246, which are shown in FIG. 8C. The inactive advertisement types 244 may be activated simply by clicking on the active/deactivate button 248 corresponding to the particular inactive advertisement type 244 the user desires to make active. Similarly, any of the inactive or active advertisement types 244 or 246 may be modified by clicking on the modify button 250 corresponding to the advertisement type 244 or 246 the user wishes to modify.

Figure 8D:
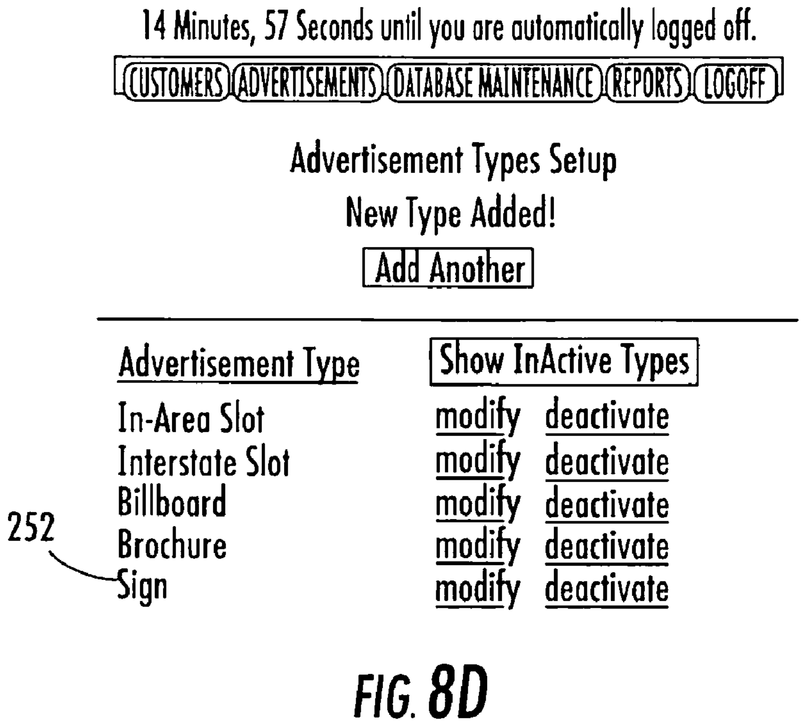

As shown in FIG. 8C, an advertisement type name 252 may be entered into the advertisement name field 240 and the add button 242 depressed to add a new advertisement type to the active advertisement types 246. The new active advertisement type 252, "Sign," is shown in FIG. 8D. Another option under the Advertisements heading 66 is the Global Commands option 234, which takes the user to a global commands screen, which allows the user to change criteria associated with all advertisement types including active and non-active advertisement types.

Figure 9A:
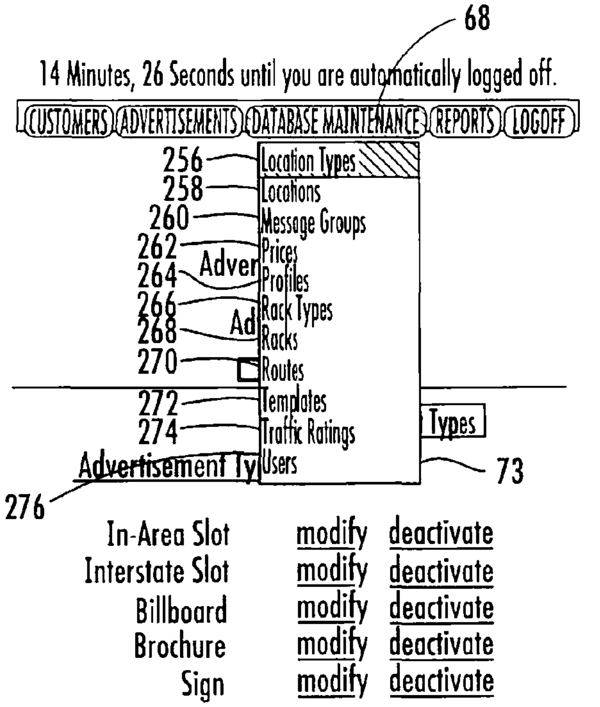
Figure 9B:
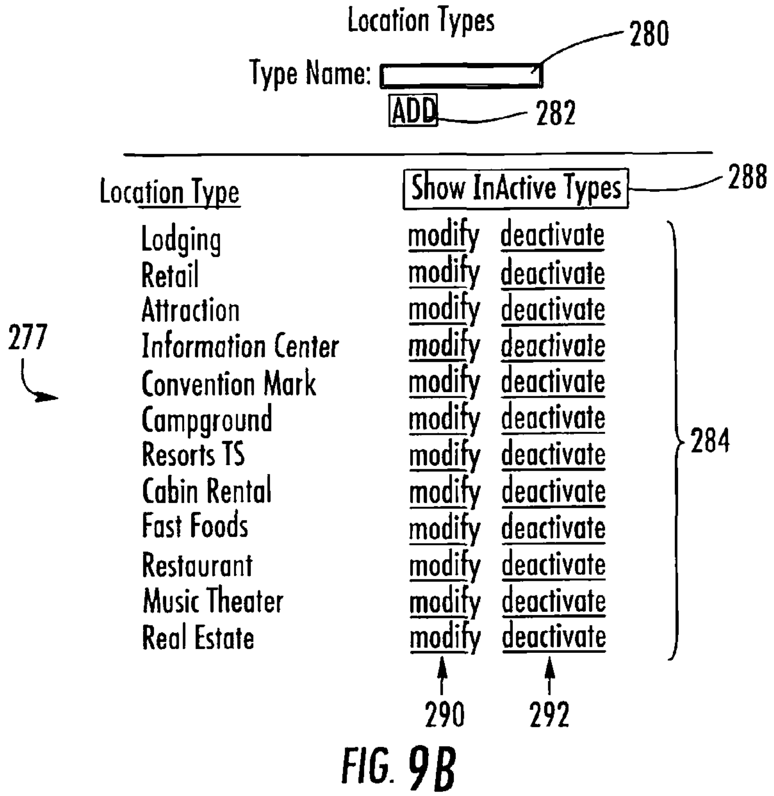

Referring now to FIG. 9A, the drop-down menu 73 under the Database Maintenance heading 68 is shown. Included under the Database Maintenance heading 68 are the following options: Location Types 256, Locations 258, Message Groups 260, Prices 262, Profiles 264, Rack Types 266, Racks 268, Routes 270, Templates 272, Traffic Ratings 274, and Users 276. Clicking the first option. Location Types 256, takes the user to the location type screen 277 as shown in FIG. 9B, which is where the user may enter a location type name into the location type name field 280 and click the add button 282 to enter a new location type into the brochure inventor, software 28. The location type screen 277 includes a listing of the active location types 284 or the inactive location types, which the user may view by clicking on the active/inactive toggle button 288. The active/inactive button 288 serves as a toggle switch between the active and inactive location types. Furthermore, the location types screen 277 provides the ability to modify the each specific location type by clicking on the modify button 290 corresponding to the particular location type the user wishes to modify. Also, the user may deactivate an active location type or activate an inactive location type by clicking on the activate/deactivate button 292 corresponding to the particular location type the user wishes to activate or deactivate. The result of activating a location type is that the brochure inventory software 28 considers the location associated with the location type to have brochure racks 24 which need to be included in a brochure inventory route 10 in order to be serviced and refilled if necessary.

Referring now to FIG. 9C, the search/add location screen 294 is shown. The Location option 258 under the Database Maintenance header 68 opens the search/add location screen 294 (see FIG. 9A). The user may either search for a location (synonymous with a brochure distribution point 14, as used in the above description of brochure inventory routes 10) or add a brochure distribution point 14 or location to the brochure inventory software 28. As shown in the upper portion of the search/add location screen 294, the search location fields 296 allow a user to enter a location name and city as a query for searching the brochure inventory database 37 (see FIG. 1). Furthermore, the search/add location screen 294 provides add location fields 198 whereby a user may add a location or brochure distribution point 14 (if used in a brochure inventory route 10) by inputting information in fields related to address and location type.

Figure 9D:
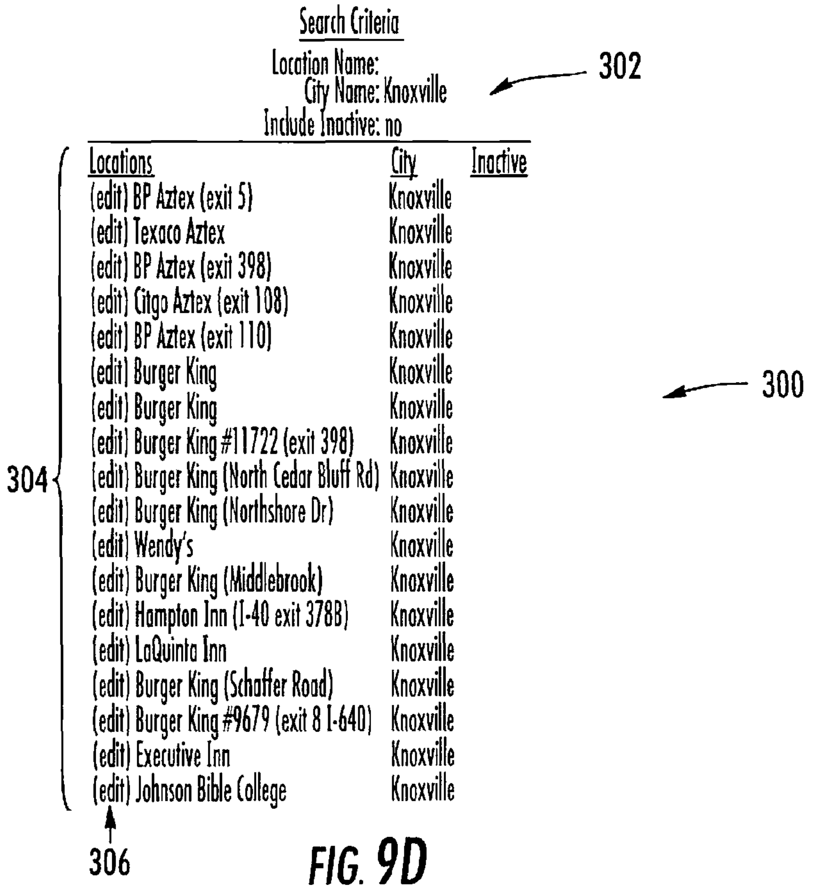

The search results screen 300 is shown in FIG. 9D. In this example, the search criteria 302 included no specific location name and a city name of "Knoxville." The brochure inventory software 28 returned all locations listing "Knoxville" as their city. Furthermore, only the active locations were included, as one criterion submitted in this example was not to include inactive locations. The search results 304 provide the opportunity for the user to edit the details of each location by clicking on the edit button 306 corresponding to a particular location.

Figure 9E:
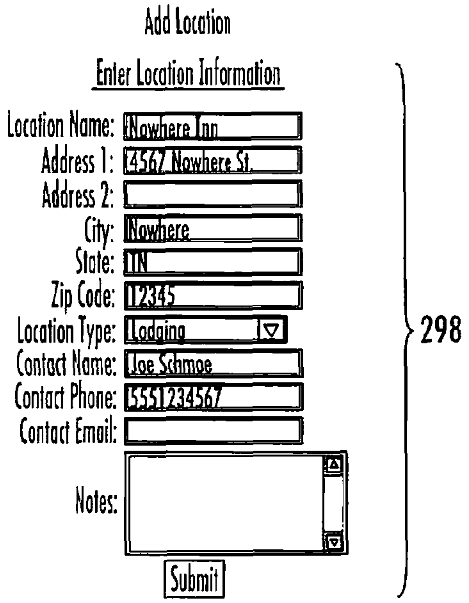
Figure 9F:
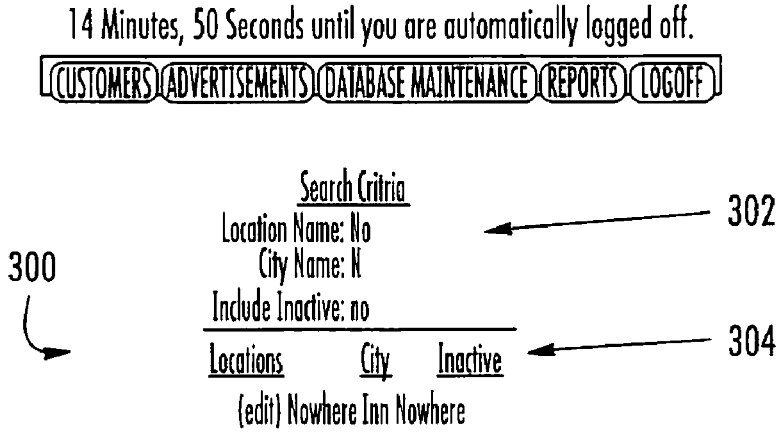

FIG. 9E shows the add locations fields 298 of the search/add location screen 294 with an example illustrating a user entering the information relating to a hypothetical location. FIG. 9F shows the search results screen 300 after the FIG. 9E example location information has been entered. As shown in the search criteria 302, the brochure inventory software 28 searches partial word queries as well as full word queries for example the search results 304 include the "Nowhere Inn" in the city of "Nowhere," and the search criteria was "No" for location name and "N" for city name.

Figure 10A:
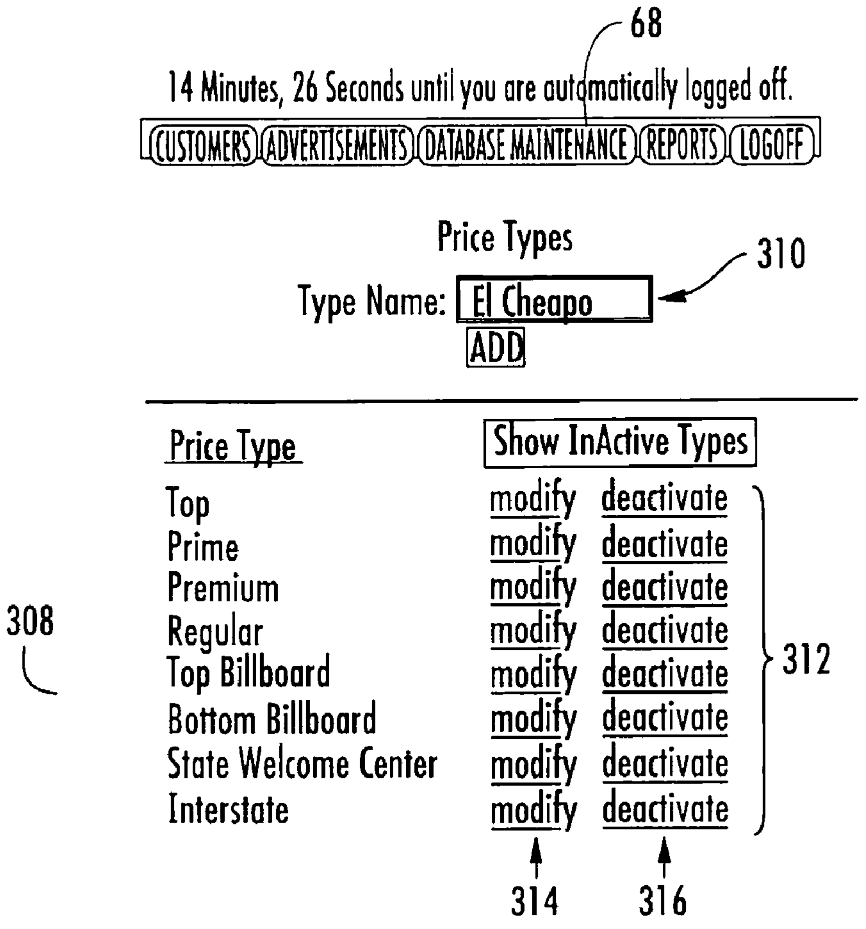

Referring now to FIG. 10A the price types screen 308 is shown. The user navigates to the price types screen by clicking on the Prices option 262 under the Database Maintenance header 68 (see FIG. 3). The add price type fields 310 are shown on the upper portion of the price types screen 308, and the price types listing 312 is shown on the lower portion of the price types screen 308. A user may enter a price type by inputting the name of the price type in the add price type fields 310. Once a price type is included in the brochure inventory software 28, the price type can be modified, activated or deactivated by clicking on the corresponding modify 314 and activate/deactivate buttons 316. The activate/deactivate feature allows a user to specify in the brochure inventory software 28 which price types are currently being used on brochure inventory routes 10. Deactivating a price type allows the user to retain the price type in the brochure inventory software 28 but to remove the price type from consideration when associating a brochure bin 36 with a price type. Other embodiments of the brochure inventory software 28 also provide a detailed description of the requirements for a brochure bin 36 to be classified under a particular price type. Once a new price type is added the new price type added screen 318 is displayed including a price types listing 312 with the new listing 320 shown at the bottom of the price types listing 312.

FIG. 11 shows the rack types screen 322, which is similar to the price types screen 308. The user navigates to the rack types screen 322 by clicking on the Rack Types option 266 under the Database Maintenance header 68 (see FIG. 3). The rack types screen 322 includes an add rack types field 324 in the upper portion of the screen and a rack types listing 326 in the lower portion of the screen. Similarly, FIGS. 12, 13, and 14 show the route screen 332, the traffic rating screen 334, and the users screen 336, respectively. The user navigates to the route screen 332, the traffic rating screen 334, and the users screen 336 by clicking on the Route option 270, the Traffic Rating option 274, and the Users option 276, respectively, each of which are under the Database Maintenance header 68 (see FIG. 3). Each of these screens 332, 334, and 336 are divided into add fields 338 and listing fields 340.

Figure 15B:
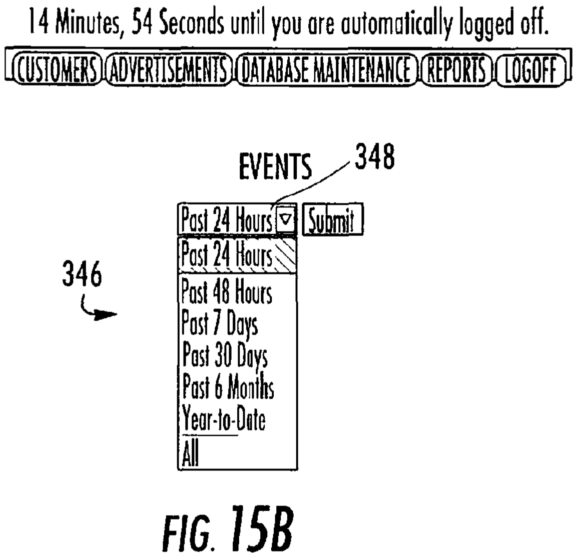
Figure 16:
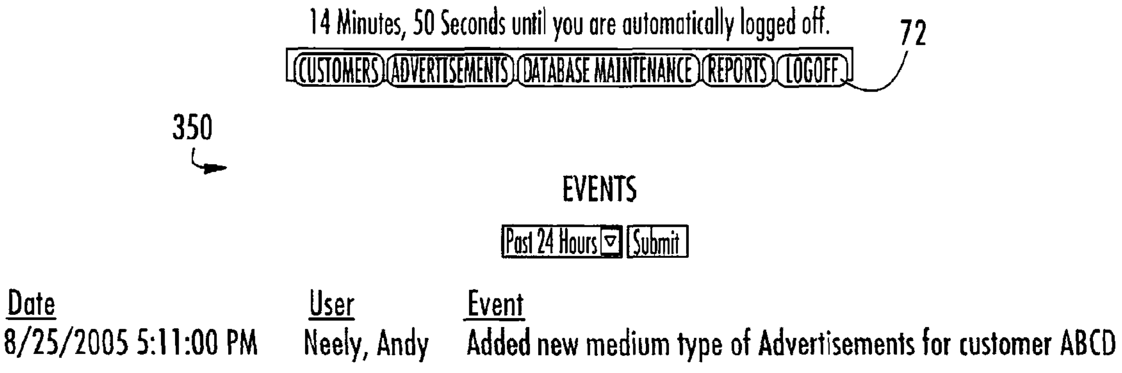
FIG. 16 is a screenshot of the event log results screen of the brochure inventory software.

Referring now to FIG. 15A, the Reports header 70 has been chosen and various options 342 are available including an event log option 344, which navigates the user to the event log screen 346, which is shown in FIG. 15B. The user may then specify a time period to search for events occurring within the brochure inventory software 28 in the event time field 348. After the user has chosen a time period, the brochure inventory software 28 navigates to the event log results screen 350, shown in FIG. 16. The event log results screen 350 displays all events that have occurred in the brochure inventory software 28 during the specified time period. An event in the preferred embodiment includes, but is not limited to any additions or modifications of any type of information stored or used in the brochure inventory database 37 (see FIG. 1D).

The brochure inventory software 28 also provides a manual logoff which the user can effectuate by clicking on the Logoff header 72 shown in FIG. 3. Such a manual logoff may be complimented by an automatic logoff such as the automatic logoff shown in this embodiment, which counts down from fifteen minutes before automatically logging the user off of the brochure inventory software 28. When a user is logged off of the brochure inventory software 28, the user is preferably navigated to the logon page 42 shown in FIG. 2.

Figure 17A:
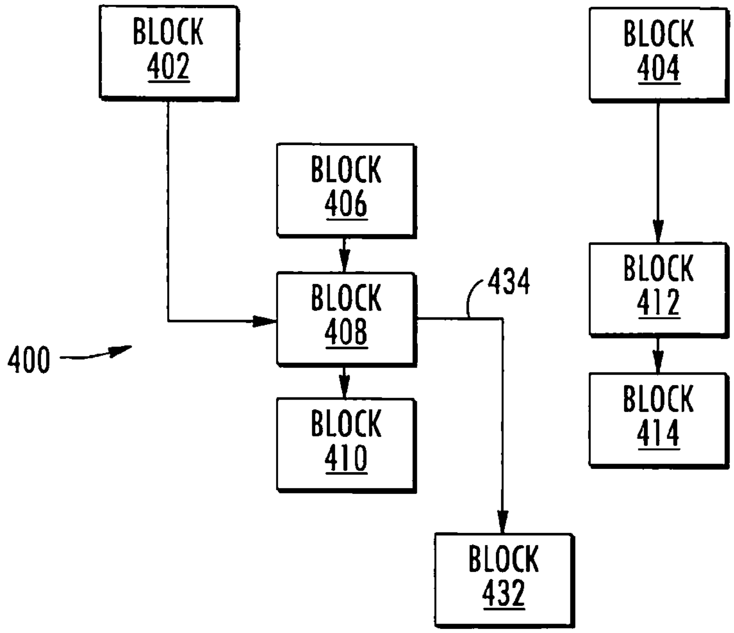
FIGS. 17A, 17B, 17C, 17D, and 17E are flowcharts of the method for managing information regarding distribution of brochures along a distribution route.

Referring now to FIG. 17A, a diagram illustrating the method for managing information 400 regarding distribution of brochures 22 along the distribution route 10 is shown. Block 402 represents storing information indicative of the capacity of the brochure bin 36. In one embodiment, such storing is done in the memory 3 of the server 35, and in another embodiment such storing is done in the memory 2 of the handheld device 30. Block 406 represents entering into the handheld device 30 a value indicating the estimated brochure level 38 for the brochure bin 36. Block 408 represents determining the number of brochures 22 necessary to fill the brochure bin 36 up to the capacity based at least in part on the value indicating the estimated brochure level 38 for the brochure bin 36. Block 408 is preferably performed by the processor 4 of the handheld device 30 but may also be performed by the processor 5 of the server 35. Block 410 represents displaying on the handheld device 30 the number of brochures 22 necessary to fill the brochure bin 36 up to its capacity and is preferably performed by the display 6 of the handheld device 30.

Furthermore, block 432 represents communicating the number of brochures 22 necessary to fill the brochure bin 36 up to the capacity to a vendor or customer associated with the brochure bin 36. Also, block 432 represents communicating an account management option such to a customer or vendor associated with the brochure bin 36. An account management option may be increasing or decreasing the number of brochures 22 normally stocked in a particular brochure bin 36 or any other management decision regarding a brochure bin 36. Communicating the number of brochures or account management options may be done over an electronic network 434 which preferably is the Internet.

Additionally. FIG. 17A illustrates block 404 which represents storing information indicative of the identity of brochure 22 associated with the brochure bin 36. Block 412 represents determining the identity of brochure 22 associated with the brochure bin 36 based at least in part on the information stored in block 404. Block 414 represents displaying on the handheld device 30 the identity of brochure 22 associated with the brochure bin 36, which identity results from block 412.

Figure 17B:
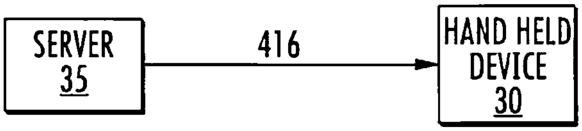
Figure 17C:
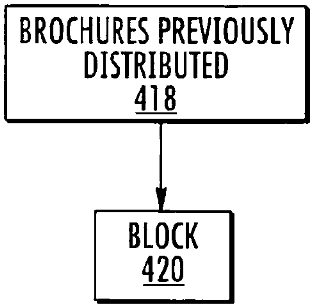

Referring now to FIG. 17B, a diagram of communicating route information 416 corresponding to the route from the central server 35 to the handheld device 30. FIG. 17C illustrates block 420 which represents determining a supply of brochures 22 provided at the distribution center 26 to be delivered on the brochure route 10. The supply is determined based at least in part on the number of brochures previously distributed 418 along the route 10. Such number 418 preferably is stored in the database 37 (FIG. 1D) of the server 35 and retrieved by the processor 5 of the server 35 as necessary.

Figure 17D:
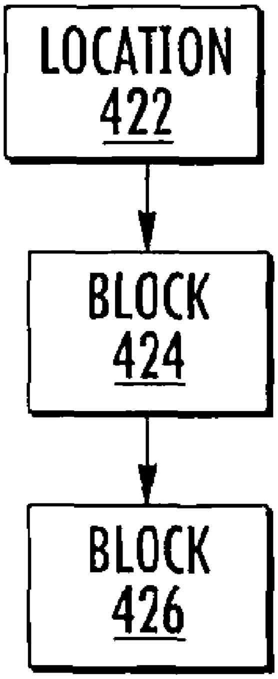
Figure 17E:
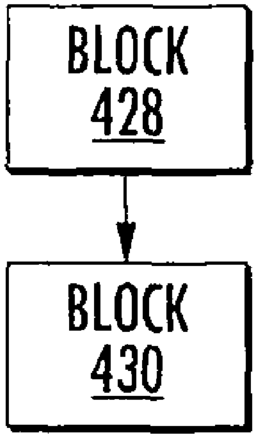

FIG. 17D illustrates block 424 representing determining route directions. The route directions indicate a location 422 of the brochure bin 36 on the route 10. Block 426 represents displaying the route directions, which preferably is performed by the display 6 of the handheld device 30. Referring to FIG. 17E, an illustration of block 428 is shown. Block 428 represents communicating to the handheld device 30 information regarding the distribution route 10. Such information is preferably stored in the memory 2 of the handheld device 30, such storing represented by block 430.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for distributing brochures and managing information regarding distribution of brochures along a brochure distribution route that includes a brochure distribution center and a number of distributions points, at least one brochure rack at each distribution point, a number of bins in each rack, each bin having a capacity, the method comprising:

(a) providing the brochure distribution route for a driver of a vehicle, the route identifying the number of distribution points;

(b) storing in a handheld device i. a location of each distribution point on the route, i. information as to the number of racks at each distribution point, ii. the number of bins and capacity of each bin in each rack at the distribution points, and iii. an identity of each brochure in each bin on the route;

(c) loading the vehicle with brochures corresponding to the identities of brochures on the route, the brochures being of an unpredictable consumption and at least some of the brochures including time sensitive material;

(d) the driver driving to a first distribution point;

(e) the driver leaving the vehicle and entering the first distribution point and inspecting each brochure rack at the first distribution point;

(f) based on the inspection, the driver entering into the handheld device an estimated percentage value indicating a fill level of each bin in each rack at the first distribution point;

(g) displaying on the handheld device a refill number and identity of brochures needed to refill each bin at the distribution point, the handheld device calculating the refill number corresponding to the number of brochures needed to refill each bin based on the identity of the brochure in the bin stored in the handheld device, the capacity of the bin stored in the handheld device, and the estimated percentage value entered into the handheld device;

(h) collecting a plurality of brochures based on the refill number and identity of brochures needed to refill each bin displayed on the handheld device;

(i) transporting the collected brochures to the racks at the first distribution point;

(j) displaying on the handheld device information indicating the identities of the bins in the racks at the first distribution point and for each identified bin displaying the identity of the brochure needed to refill the identified bin;

(k) refilling the bins in each rack at the first distribution point based on the refill number and identity of brochures needed to refill each bin displayed on the handheld device;

(l) driving the vehicle to a plurality of distribution points on the route and repeating steps e through k that were performed at the first distribution point to thereby refill the bins of the racks at the plurality of distribution points;

(m) recording in the handheld device the identity of each bin that was refilled and recording in the handheld device the number and identity of brochures used to refill each bin that was refilled; and (n) connecting the handheld device to a server and transferring information about the refilling of the bins including the identity of each bin that was refilled and the number and identity of brochures used to refill each bin that was refilled.

2. The method of claim 1 wherein:

(a) the storage step (b) comprises storing a graphical representation of each rack at each location with each bin of each rack graphically represented; and (b) the display step (j) comprises displaying the graphical representation of each bin in the racks being refilled with information displayed in association with the graphical representations of the bins indicating the brochure needed to refill each identified bin.

3. The method of claim 1 wherein:

(a) the storage step (b) comprises storing a graphical representation of each rack at each location with each bin of each rack graphically represented; and (b) the entering step (f) comprises displaying the graphical representation of each bin in the racks and entering the estimated percentage values in association with the graphical representations of the bins.

4. The method of claim 1 further comprising:

(a) storing time data associated with operations performed on the handheld device during the performance of the method; and (b) analyzing the efficiency of the driver in refilling the racks based on the time data and the information about refilling the racks.

5. The method of claim 1 further comprising:

(a) storing time data associated with operations performed on the handheld device during the performance of the method;

(b) determining and recording a position of the handheld device with a GPS; and (c) analyzing the efficiency of the driver in refilling the racks based on the time data, the position information, and the information about refilling the racks.

* * * * *